United States Patent
Kainen

Patent Number: 6,115,101
Date of Patent: *Sep. 5, 2000

[54] METHOD AND APPARATUS FOR PRODUCING THREE-DIMENSIONAL GRAPHIC IMAGES USING A LENTICULAR SHEET

[76] Inventor: Daniel B. Kainen, 137 Varick St., New York, N.Y. 10013

[*] Notice: This patent is subject to a terminal disclaimer.

[21] Appl. No.: 08/775,521

[22] Filed: Jan. 2, 1997

Related U.S. Application Data

[63] Continuation-in-part of application No. 08/433,976, May 4, 1995, Pat. No. 5,600,402.
[51] Int. Cl.[7] ............................ G03B 27/32; G03B 35/00; H04N 9/47
[52] U.S. Cl. ................................. 355/22; 396/330; 348/54
[58] Field of Search .................................. 355/22, 27, 33, 355/55, 77; 396/330; 348/42, 51, 54, 55, 59; 358/527, 450

[56] References Cited

U.S. PATENT DOCUMENTS

| | | | |
|---|---|---|---|
| 3,633,301 | 1/1972 | Calabuig | 40/160 |
| 5,113,213 | 5/1992 | Sandor et al. | 355/72 |
| 5,192,969 | 3/1993 | Igarashi et al. | 355/22 |
| 5,279,912 | 1/1994 | Telfer et al. | 430/17 |
| 5,539,487 | 7/1996 | Taguchi et al. | 354/115 |
| 5,600,402 | 2/1997 | Kainen | 355/22 |
| 5,680,171 | 10/1997 | Lo et al. | 348/42 |

*Primary Examiner*—Safet Metjahic
*Assistant Examiner*—Hung Henry Nguyen
*Attorney, Agent, or Firm*—Jay H. Maioli

[57] ABSTRACT

A system for producing lenticular three-dimensional images in which the images are not bonded to the lenticular sheet, whereby a large number of images may be viewed using a single lenticular sheet. Such images may be used to construct a book or scroll of images, or may be sequentially displayed to form a motion picture. Three-dimensional encoded images are produced by capturing multiple parallax angle views of a scene, separating each view into narrow rectangular segments, interleaving these segments and displaying the resulting image on a flat surface. The image is placed at the focal plane of a lenticular sheet, and the interleaved segments of the image are aligned with the lenticules of the lenticular sheet. When the encoded image is viewed through the lenticular sheet a 3-D image is formed. The 3-D stereoscopic encoded image may be formed on a computer-driven printer, on a photographic emulsion or on a video display terminal.

19 Claims, 27 Drawing Sheets

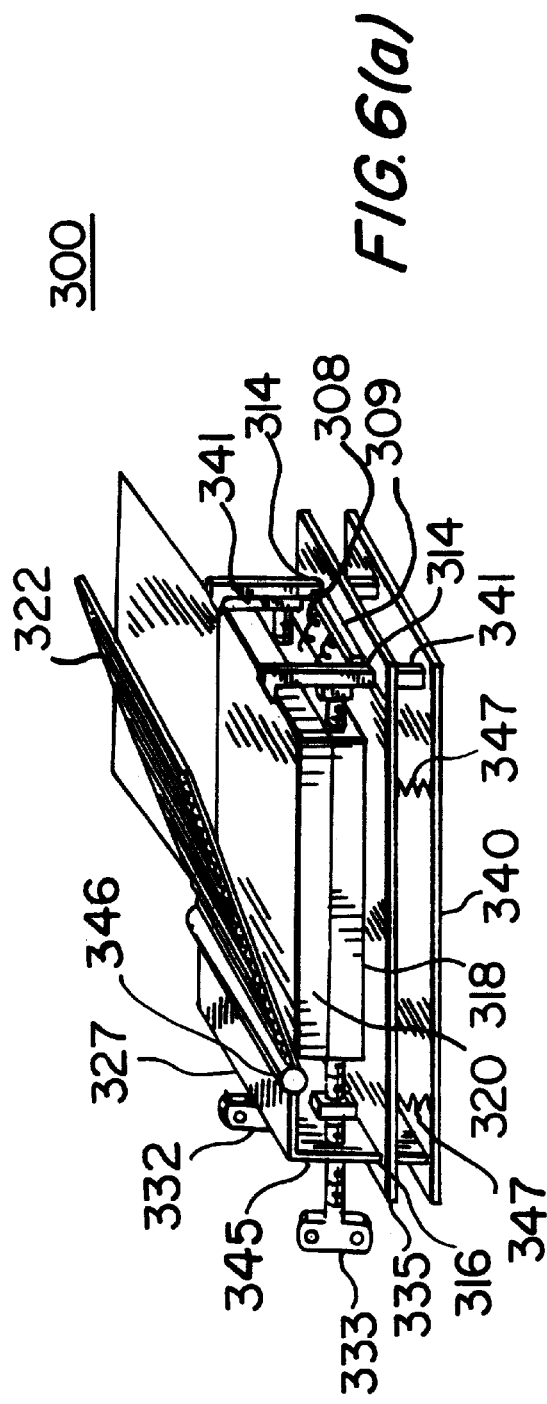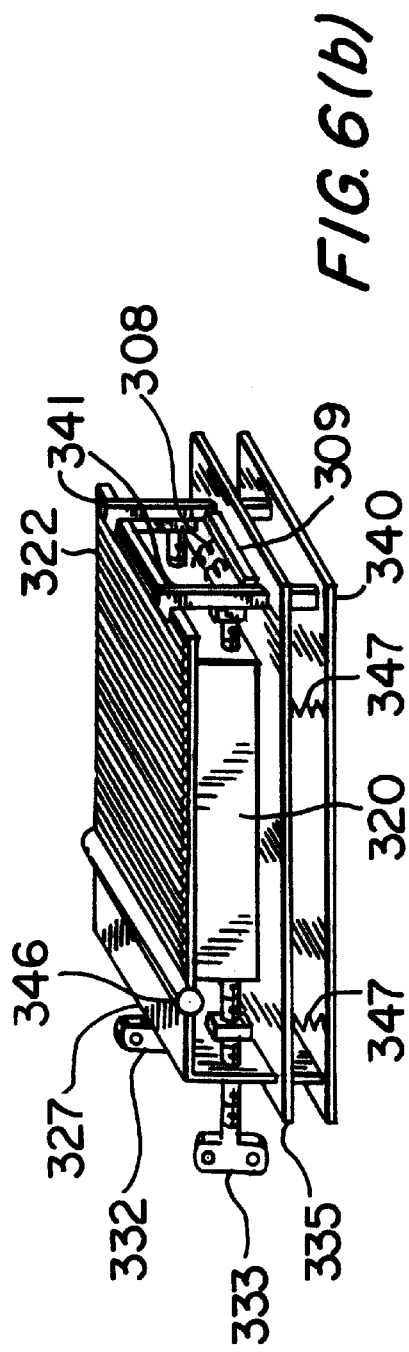

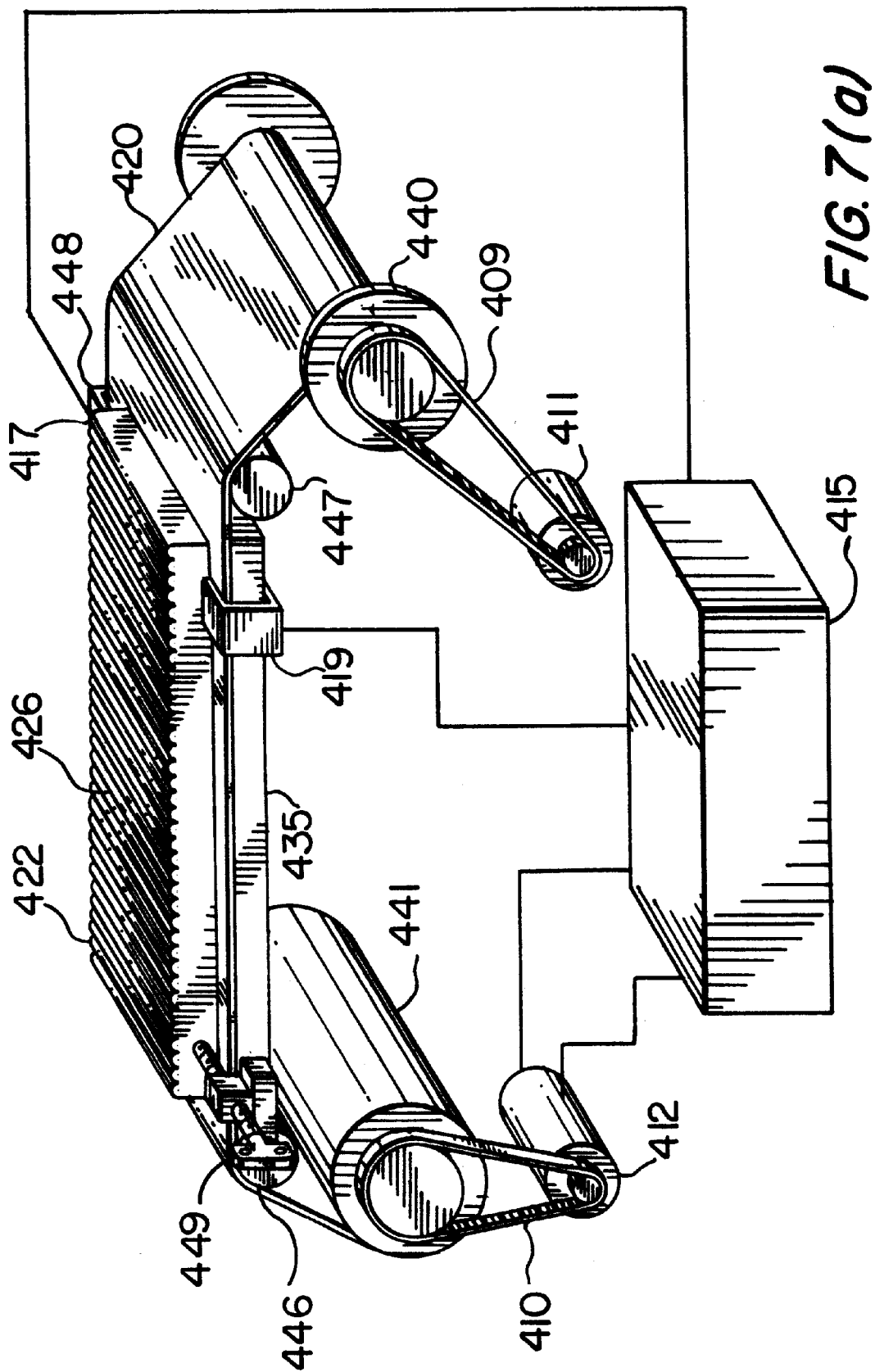

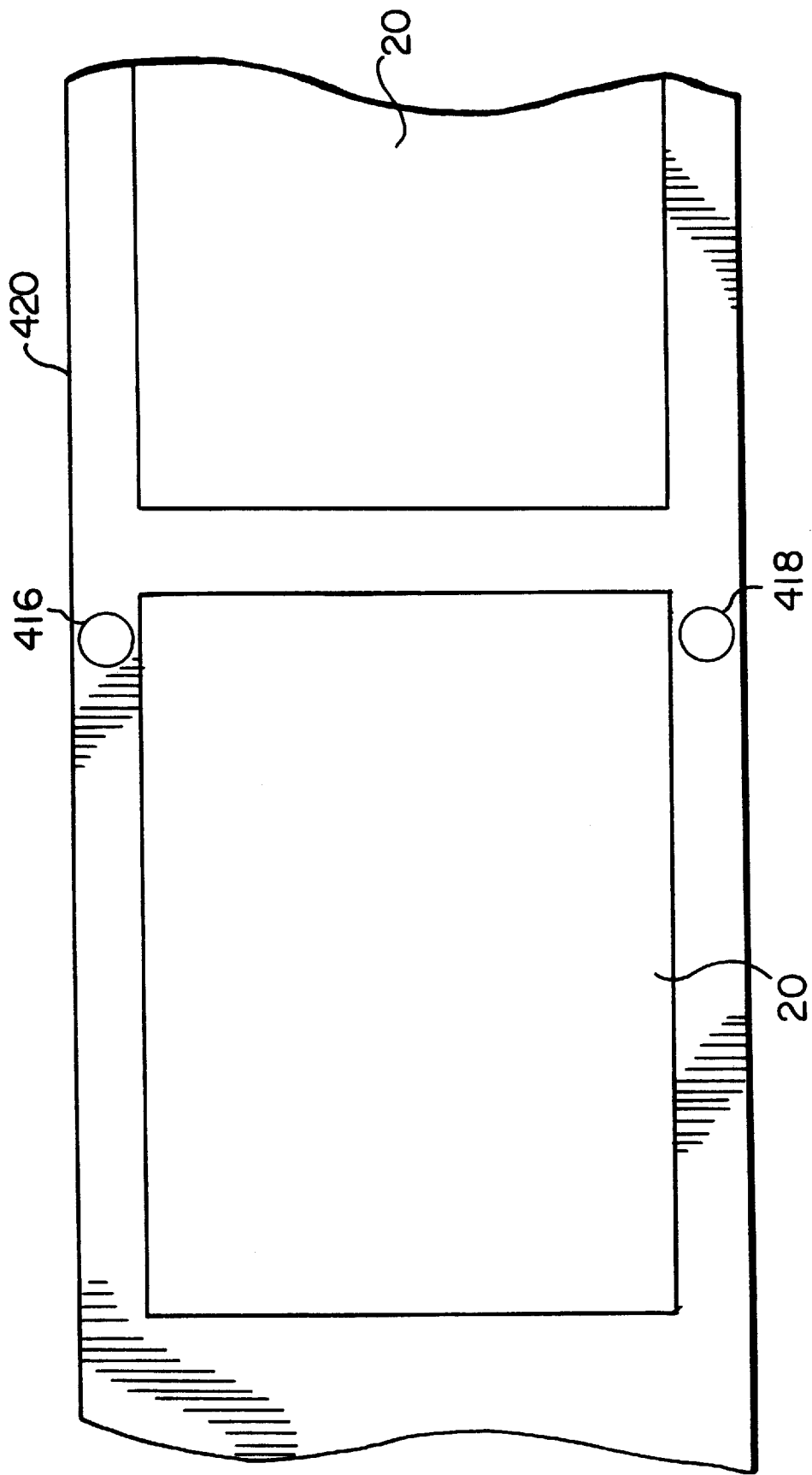

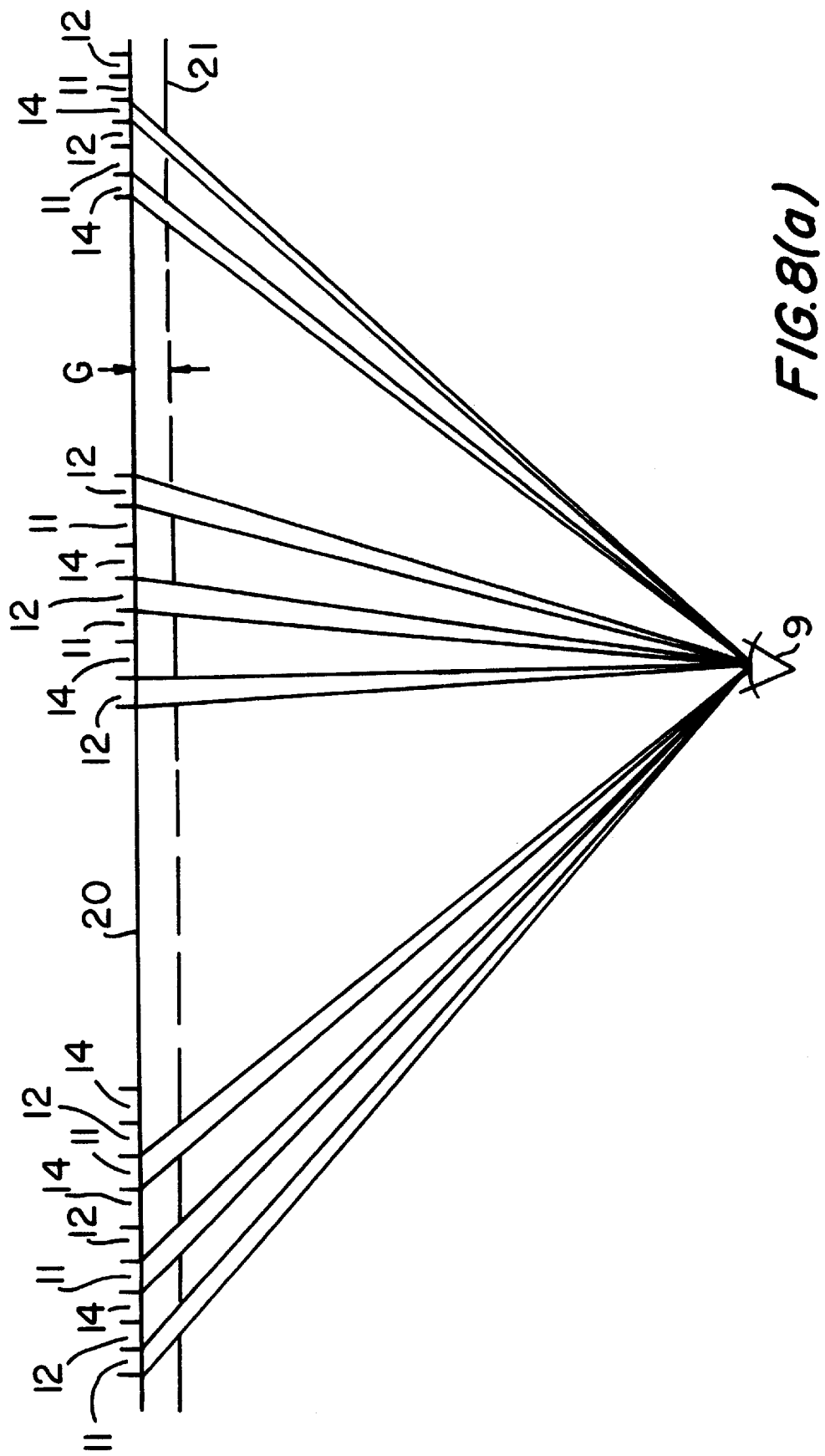

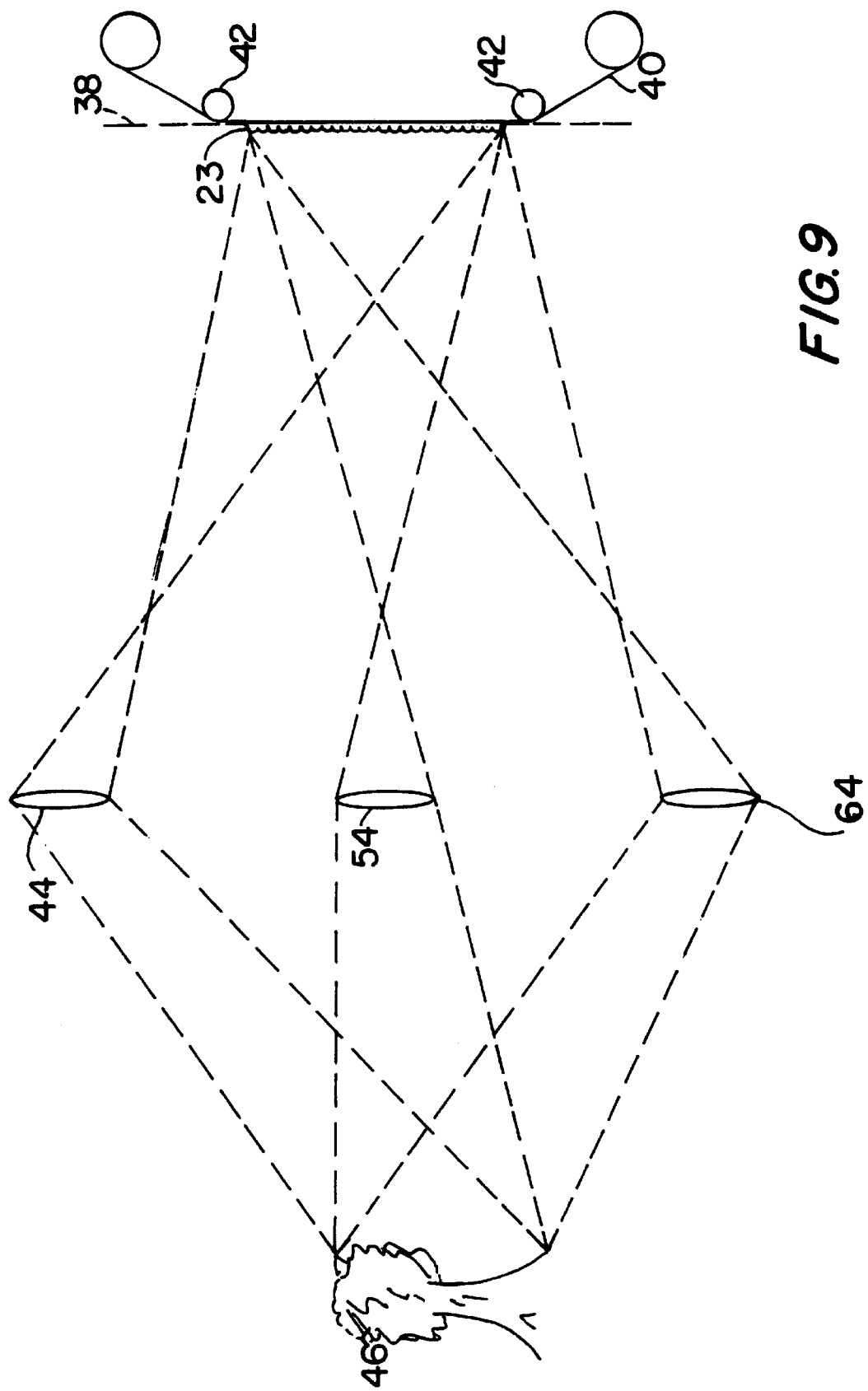

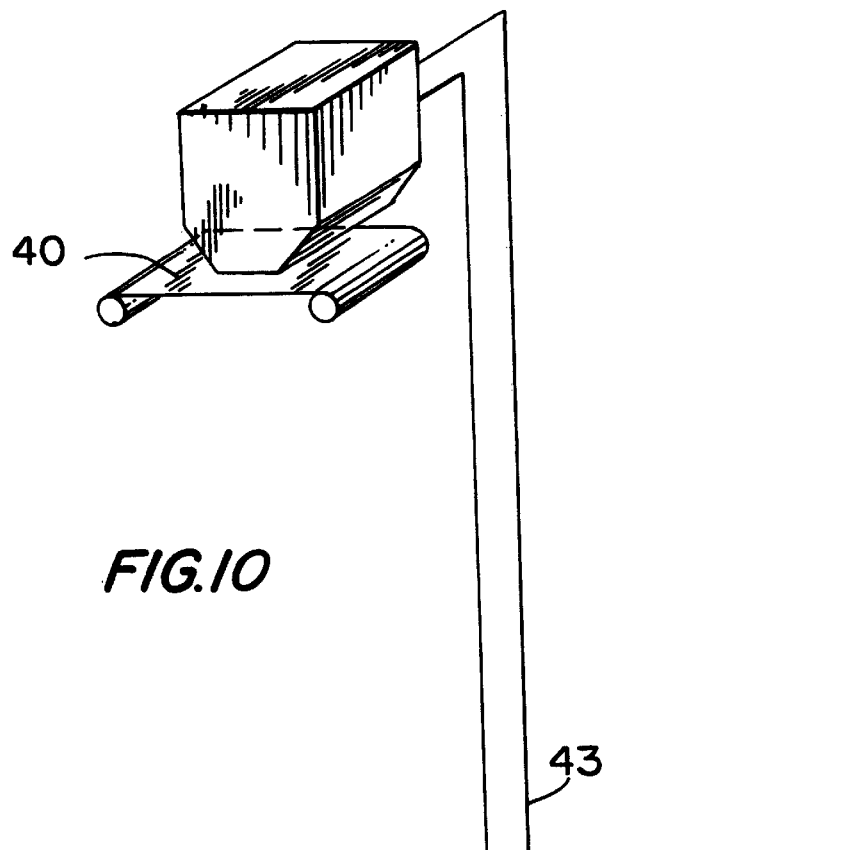
FIG.10
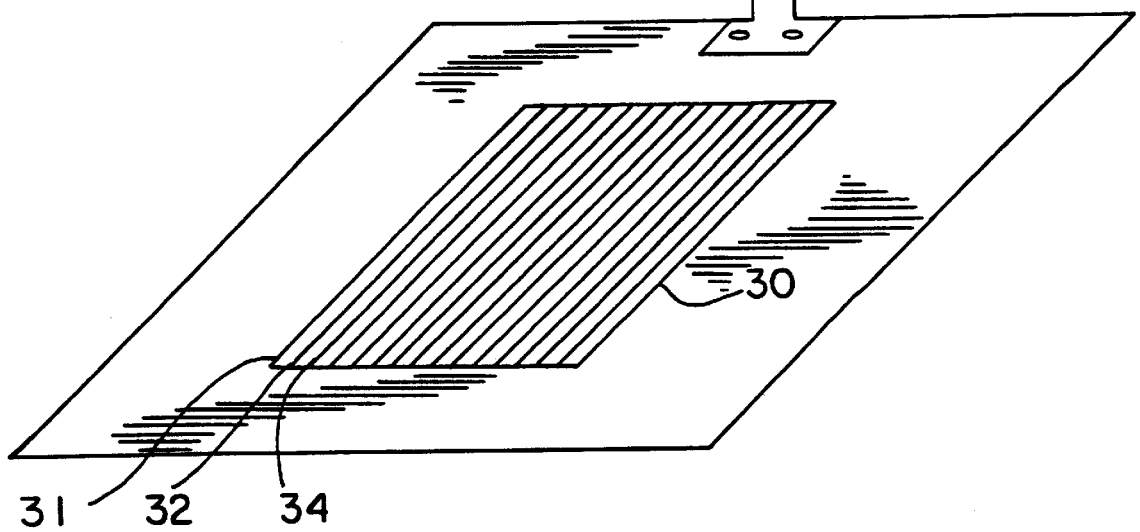
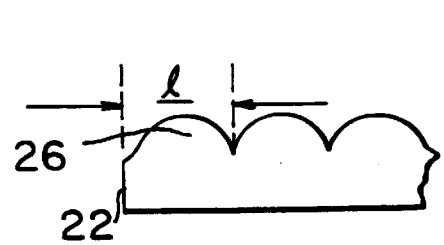
FIG.11　　　FIG.12

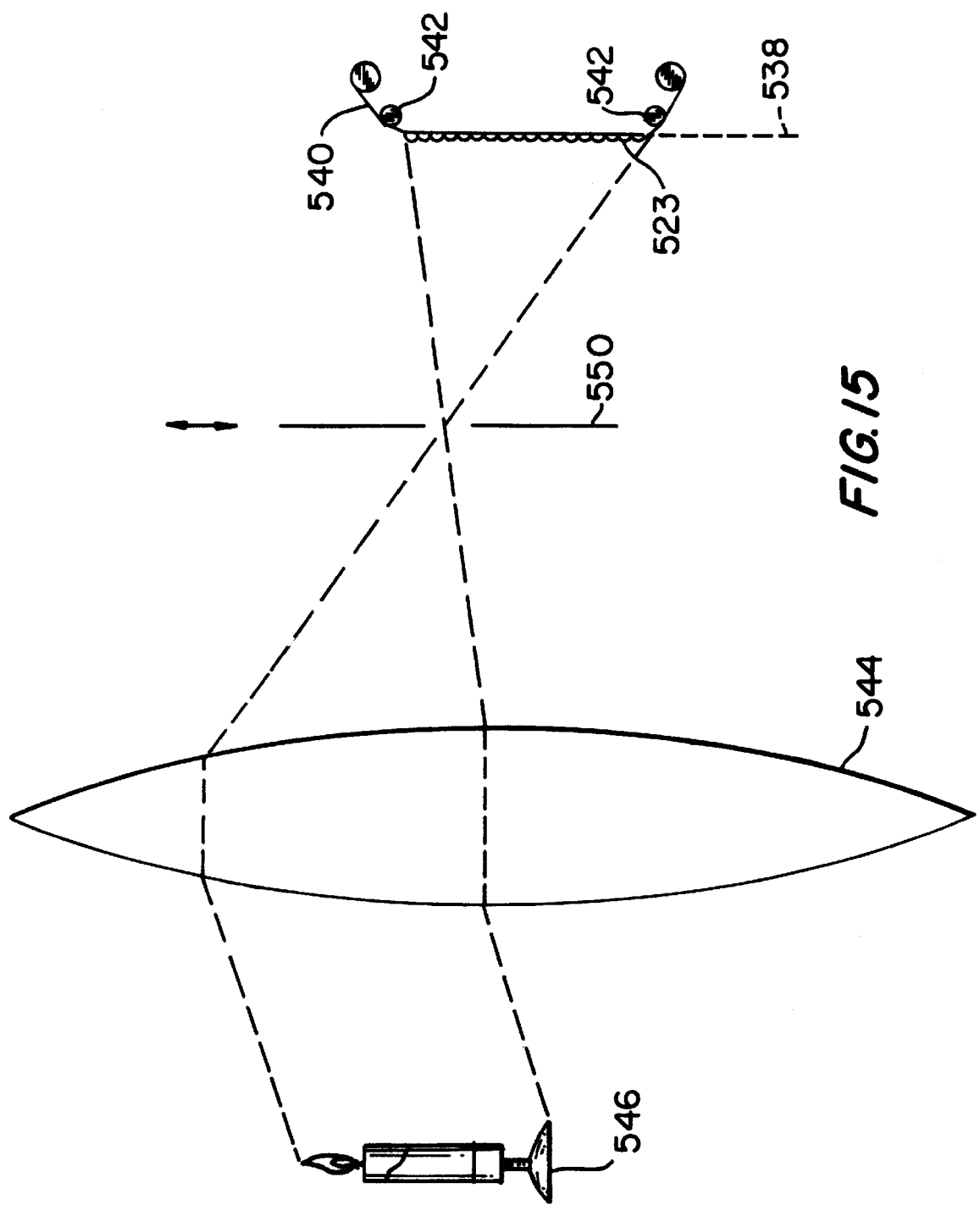

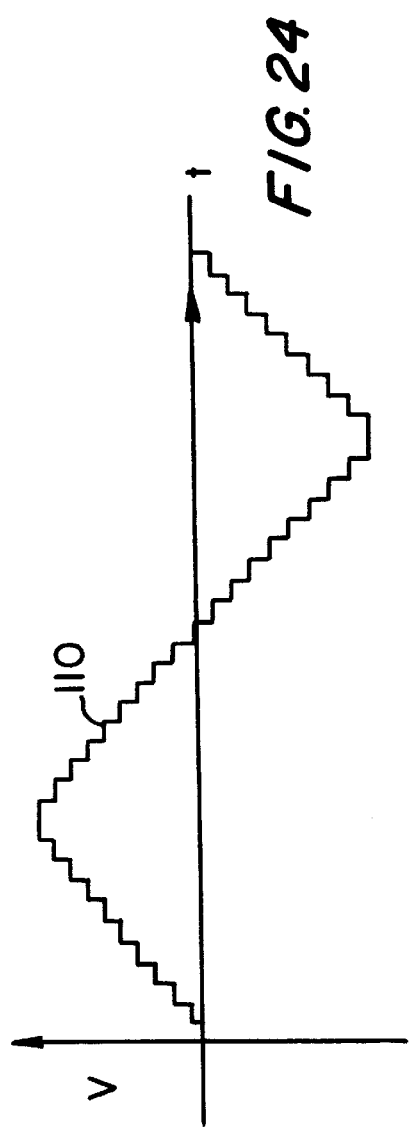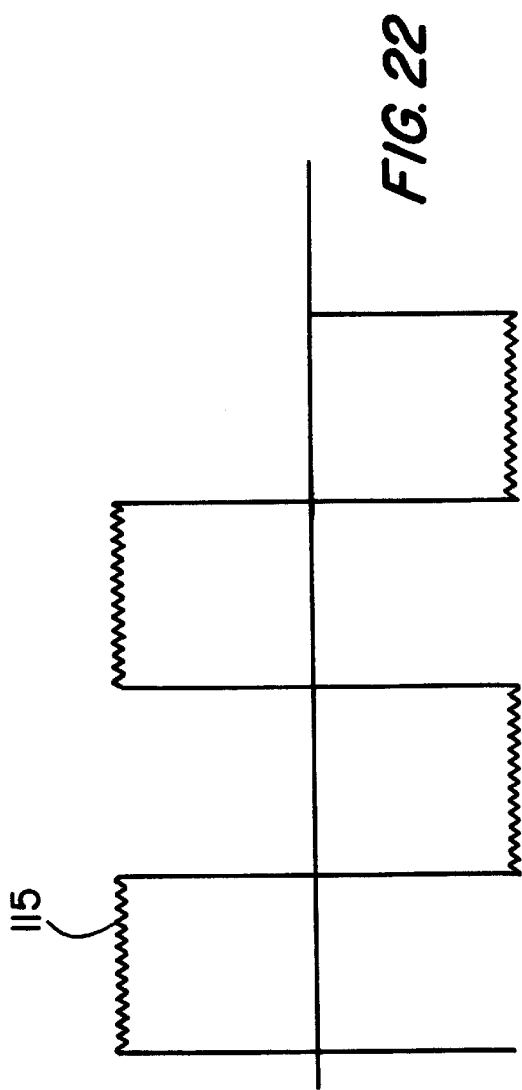

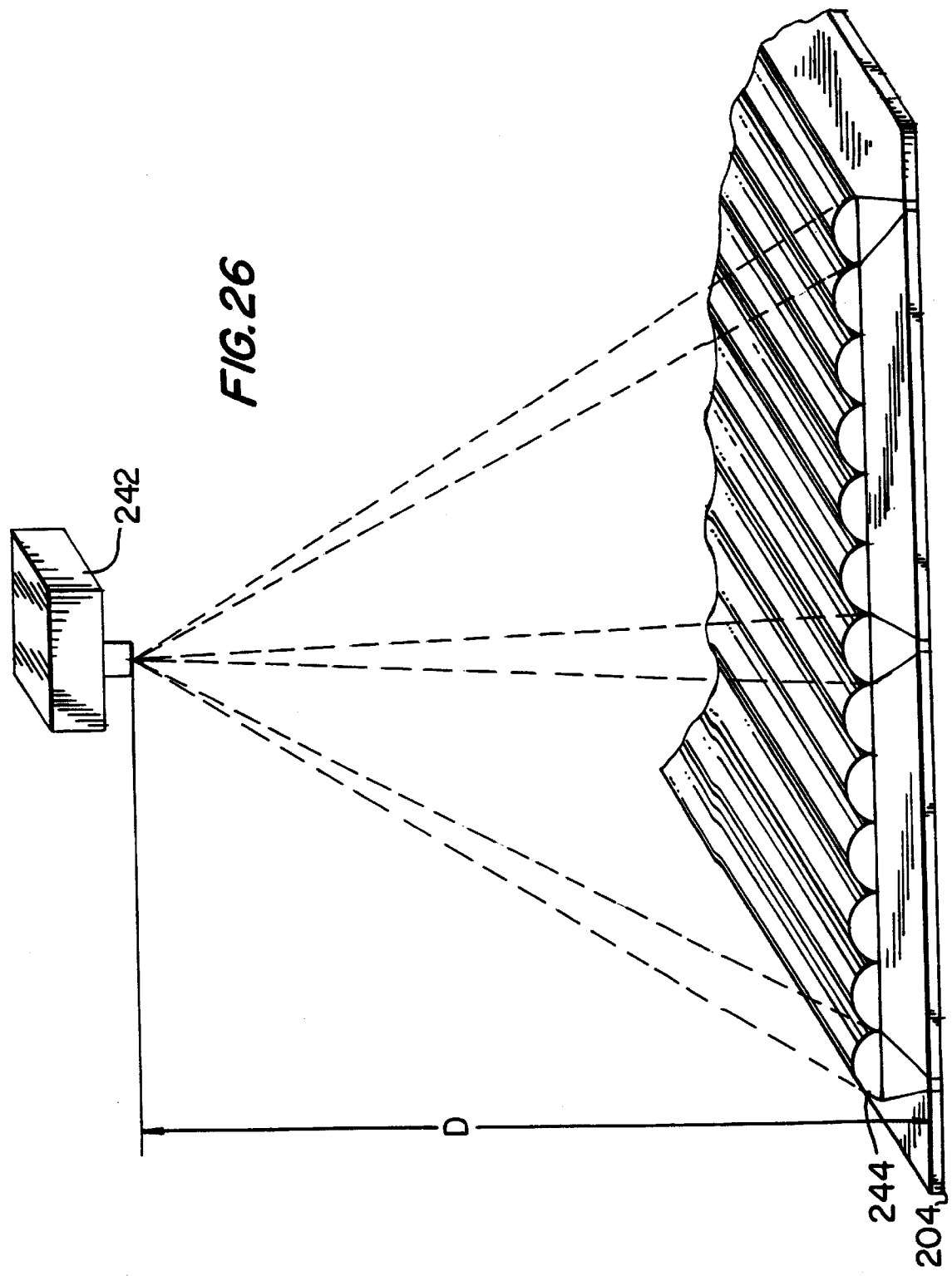

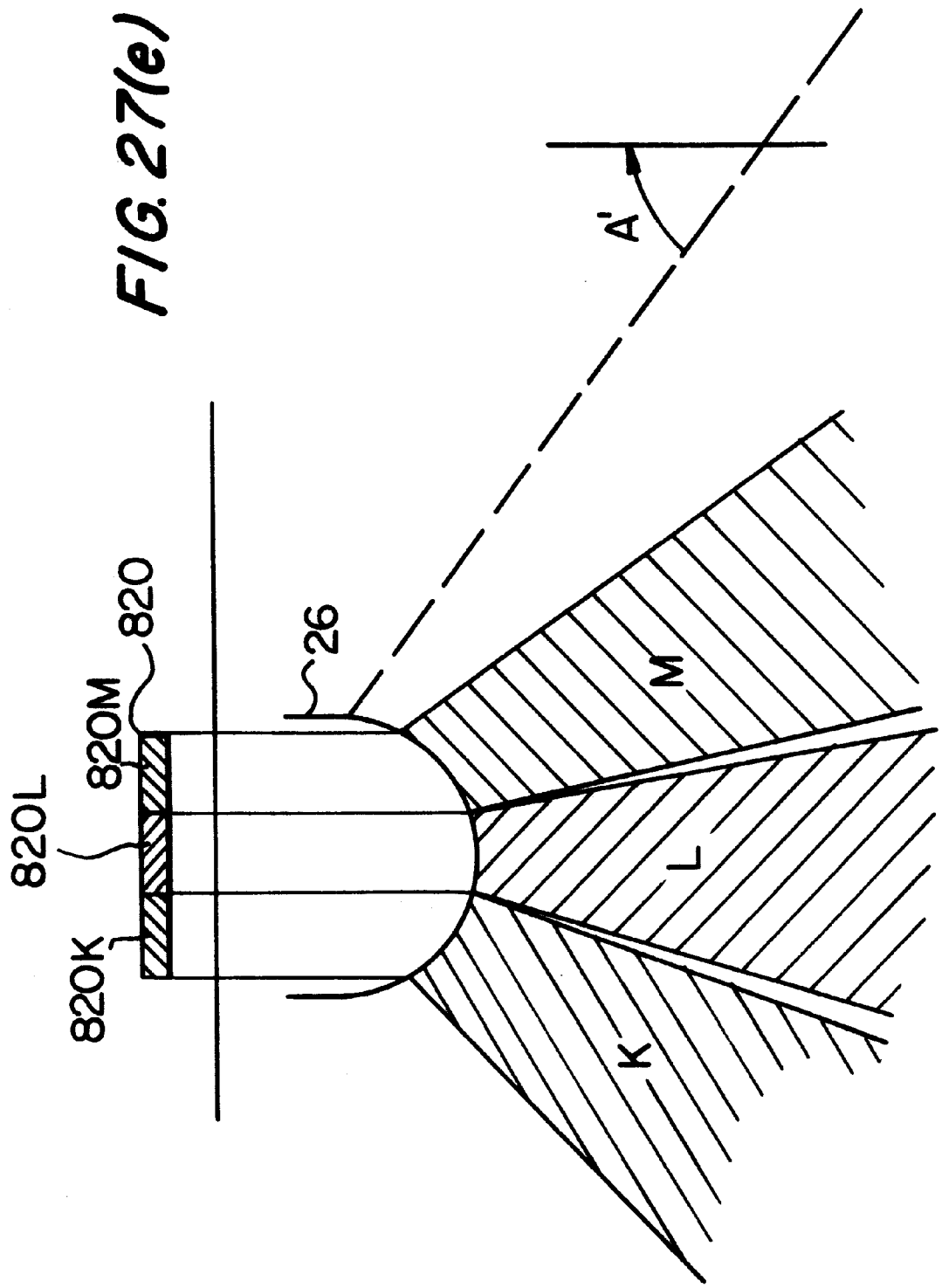

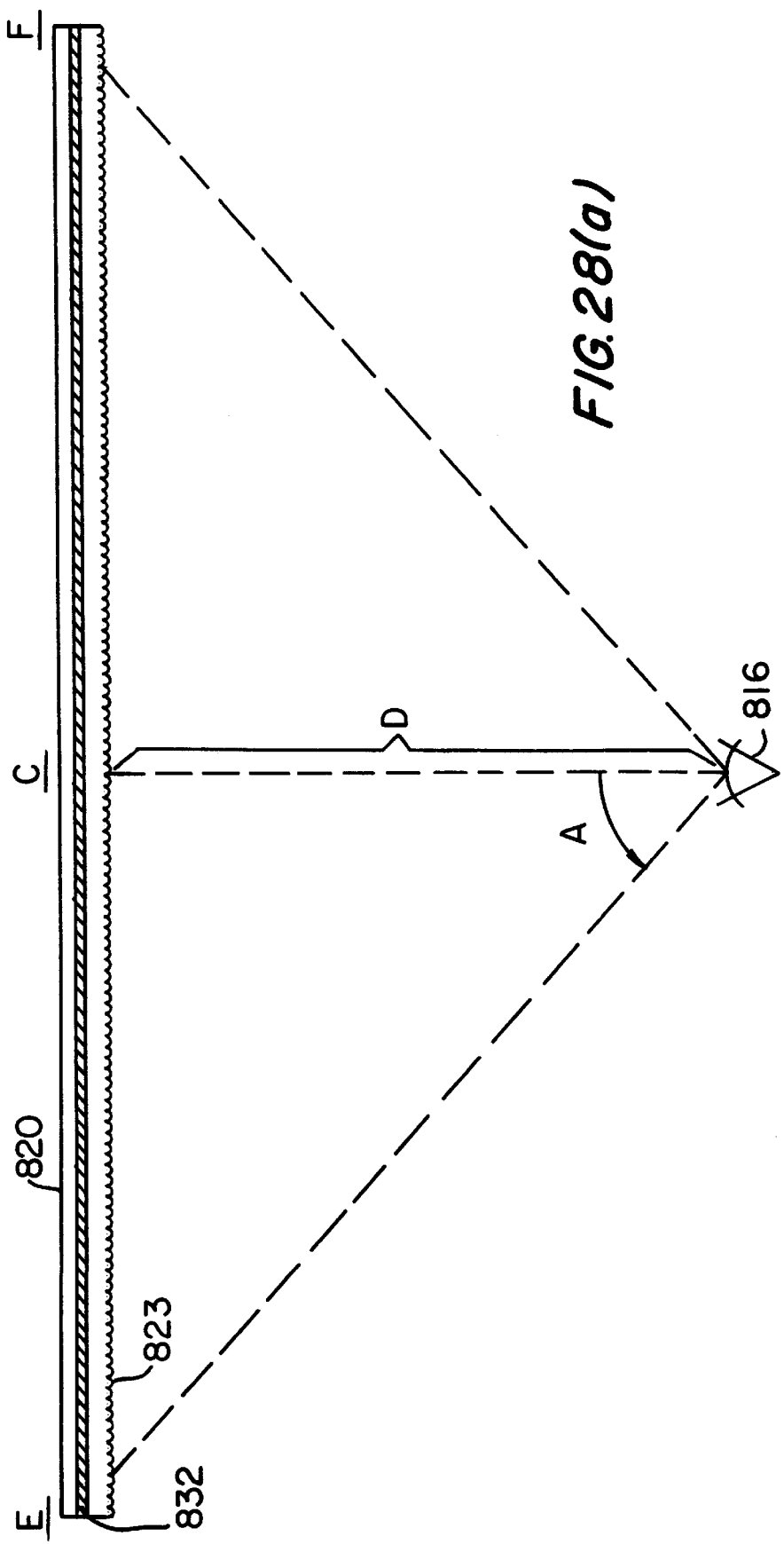

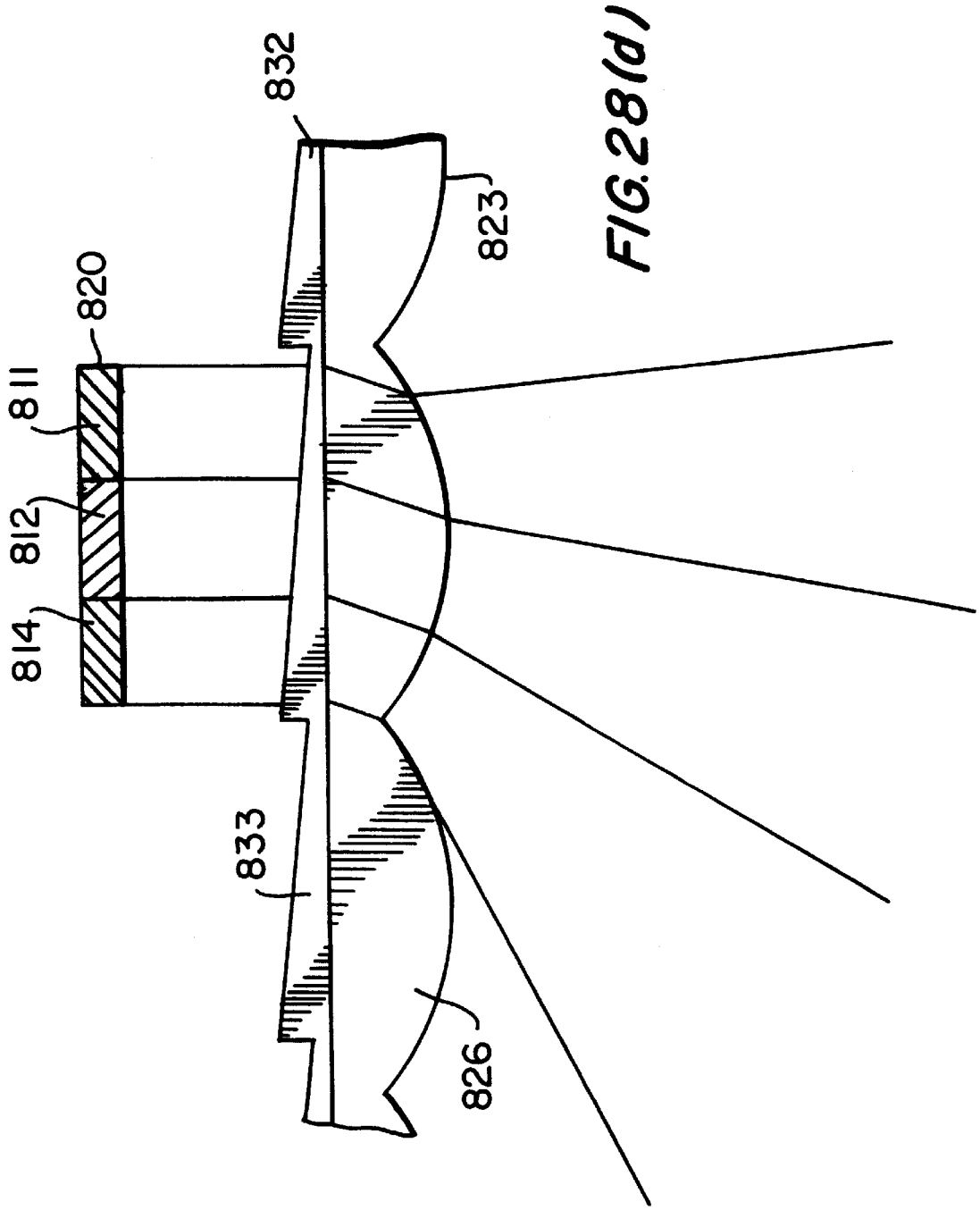

METHOD AND APPARATUS FOR PRODUCING THREE-DIMENSIONAL GRAPHIC IMAGES USING A LENTICULAR SHEET

This is a continuation-in-part of application Ser. No. 08/433,976 filed May 4, 1995 now U.S. Pat. No. 5,600,402.

BACKGROUND OF THE INVENTION

1. Field of the Invention

This invention relates generally to the field of 3-D stereo imaging and, more particularly, to producing low-cost, 3-D stereo encoded images on computer-driven printers, on photographic emulsions, and on video display terminals using a computer or other encoding device. The 3-D stereo encoded images thus produced are viewed through a separate lenticular sheet to produce a 3-D image.

2. Description of Related Art

The production of 3-D stereo representations by forming an image on a sheet bonded to a lenticular laminate is now known. U.S. Pat. No. 4,814,826 discloses a method for exposing lenticular photographic print material from multiple film negatives each representing a different parallax view of a subject to produce a 3-D stereo image.

Methods for producing hard-copy 3-D images from a computer printer are also known. U.S. Pat. No. 5,121,343 discloses a computer-driven printer for producing self-aligned stereo images using a special paper that is bonded to a sheet of polarizing material. The resultant sheet is viewed through polarized glasses to reveal a 3-D image.

Known methods of producing 3-D images have several drawbacks. For example, because the underlying image and the viewing sheet must be precisely aligned, the production of these images has required that the printed image be bonded with the viewing sheet. This means that the resulting laminate is expensive to produce, and the laminate is much thicker than the underlying picture, making it cumbersome to package where multiple images in a single publication are desired, for example, in a calendar or a book. Further, special equipment and expertise are required to produce these images, making their production inconvenient for the casual user.

Where a polarizer sheet is used, special spectacles must be worn to separate right- and left-eye images. This adds expense, makes viewing more cumbersome and limits the number of viewers that can observe the three dimensional image at one time. Such a system would be impractical for an advertising display.

OBJECTS AND SUMMARY OF THE INVENTION

A principal object of the present invention is to provide a simplified method of producing 3-D stereo images using standard, low-cost printing technology.

It is a further object of the present invention to provide a method for producing 3-D stereo images that do not require the viewer to wear special spectacles.

It is a still further object of the present invention to provide a system for producing 3-D stereo images using a computer.

It is an additional object of the present invention to provide a method for producing 3-D stereo images that may be viewed in a sequential fashion, as in a motion picture.

According to one embodiment of the present invention, 3-D stereo images are produced by scanning several views of a scene into a computer memory, merging the images to produce a sequence of interleaved, narrow, rectangular segments of each view, and printing the resulting file on a computer printer such that the spacing between the interleaved rectangles corresponds to the spacing of the lenticules of a lenticular sheet. The printed image and the lenticular sheet are then aligned in a frame to produce a 3-D image.

According to another embodiment of the present invention, 3-D stereo images are produced by exposing photographic film to multiple views of the same scene at different parallax angles through a lenticular sheet. The resulting image is then printed at a standard enlargement size such that the spatial frequency of the resulting lenticularly exposed areas corresponds to the spatial frequency of a second lenticular sheet.

In still another embodiment of the present invention, interleaved, narrow, rectangular segments of multiple parallax angle views of a subject are printed on a photographic enlarger using a mask. The mask is moved across the print and exposures are made of each view such that the pitch of the interleaved images corresponds to the spatial frequency of a lenticular sheet.

According to yet another embodiment of the present invention, the interleaved rectangular segments produced by one of the three embodiments described above are made on a transparent sheet, such as a photographic slide, and projected onto a frosted screen that is covered with a lenticular sheet whose spatial frequency is equal to the spatial frequency of the interleaved segments of the projected image. When the projected image is viewed through the lenticular sheet, a 3-D image is formed. The projected images may be still pictures or frames of a motion picture.

In another embodiment of the present invention, the image file produced in the first embodiment described above is displayed on a video display terminal. The video display terminal is covered with a lenticular sheet. The spatial frequency of the interleaved image segments is equal to the spatial frequency of the lenticular sheet. When the image on the video display terminal is viewed through the lenticular sheet, a 3-D image is formed.

In yet another embodiment of the project invention there is provided a video display screen. In proximity to the surface of the screen are two lenticular sheets and between the sheets is a movable array of slits. Each slit is aligned with a lenticule on each of the sheets. Movement of the array of slits directs the image projected through the pair of associated lenticules to scan. Video images are sequentially displayed on the video screen synchronously with motion of the slit to produce a stereo image or an auto-stereo image.

The above and other objects, features, and advantages of the present invention will become apparent from the following detailed description of illustrative embodiments thereof to be read in conjunction with the accompanying drawings, in which like numerals represent the same or similar elements.

BRIEF DESCRIPTION OF THE DRAWINGS

FIGS. 6(a) and 6(b) are representations of an alternative alignment apparatus to be used with the embodiment of FIG. 1

FIGS. 7(a) and 7(b) are representations of another alternative alignment apparatus to be used with the embodiment of FIG. 1.

FIG. 9 is a representation of a second embodiment according to the present invention;

FIG. 10 is a view of a photographic enlarger used in the embodiment of FIG. 9;

FIG. 11 is a detailed view of the printed image produced in the embodiment of FIG. 9;

FIG. 12 is a detailed view of the lenticular sheet used to view the printed image produced by the embodiment of FIG. 9;

FIG. 15 is a representation of yet another alternative to the embodiment shown in FIG. 9.

FIG. 22 is a representation of an alternative waveform to be used in conjunction with the embodiment shown in FIG. 20.

FIG. 24 shows another waveform to be used in conjunction with the embodiment shown in FIG. 20.

FIG. 26 is a representation of a method of producing a mask used in conjunction with the embodiment of FIG. 24.

FIGS. 27(a) through 27(e) represent a seventh embodiment according to the present invention.

FIGS. 28(a) through 28(d) represent an alternative arrangement of the embodiment of FIGS. 27(a) through 27(e)

DETAILED DESCRIPTION OF THE PREFERRED EMBODIMENTS

Figure 1:
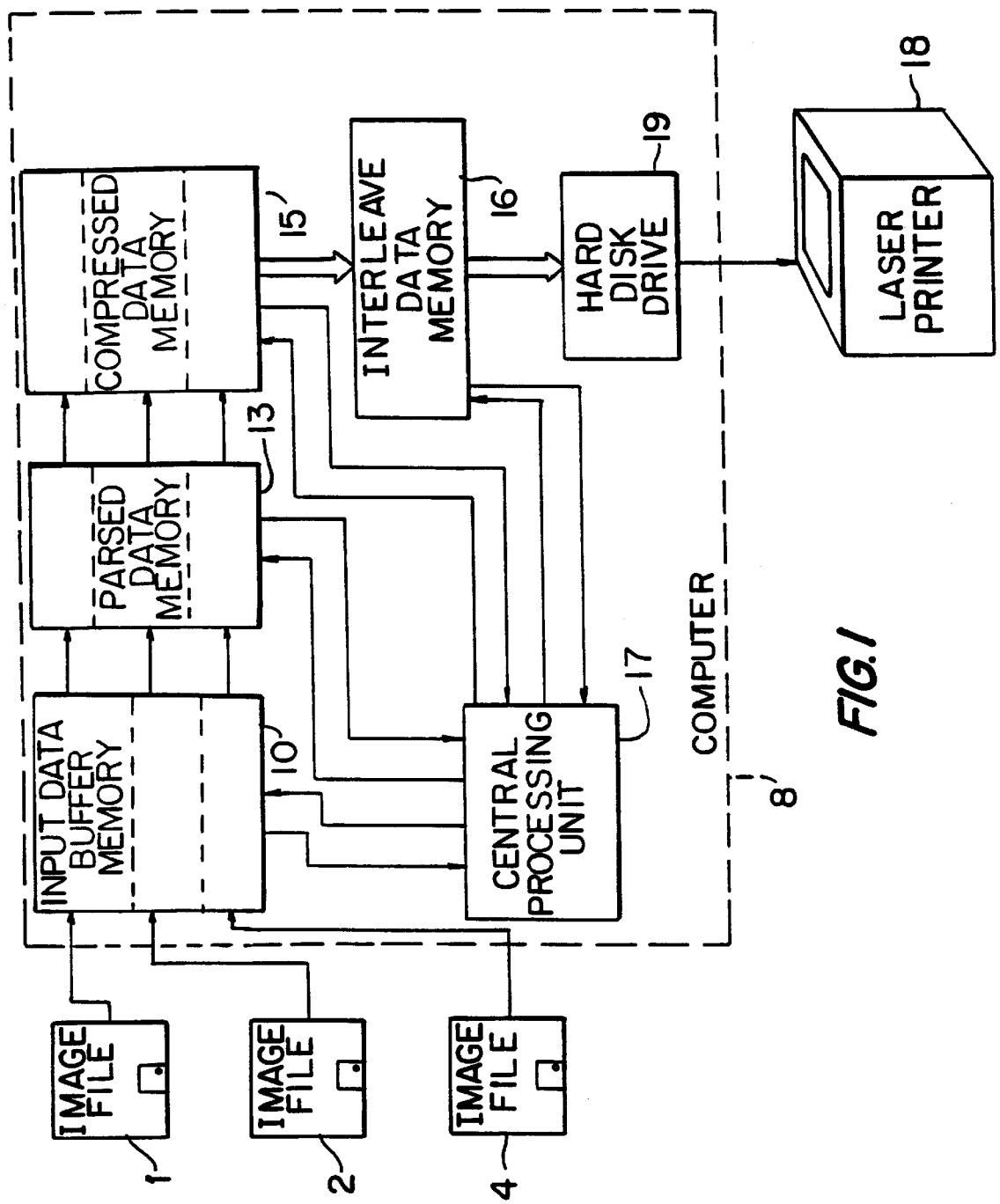
FIG. 1 is a representation of a first embodiment according to the present invention.

FIG. 1 shows a computer 8 and printer 18 used in the first embodiment of the present invention, in which input image files 1, 2, and 4, which represent views of a subject from different parallax angles, are captured by some known method, such as by a scanner or a CCD camera. These image files are loaded into an input data buffer segment 10 of the computer memory by a central processing unit (CPU) 17. The data for each of the input image files 1, 2, 4 is parsed into narrow rectangular fields by the CPU 17 and stored in a parsed data memory segment 13 of the overall computer memory. The width of each of the rectangular fields is compressed by a ratio equal to the reciprocal of the number of parallax views of the subject captured by the CPU 17 and is stored in a compressed data memory segment 15 of the computer memory. The compressed fields are then interleaved by the CPU 17 and stored in an interleave data memory segment 16 of the computer memory.

Figure 2:
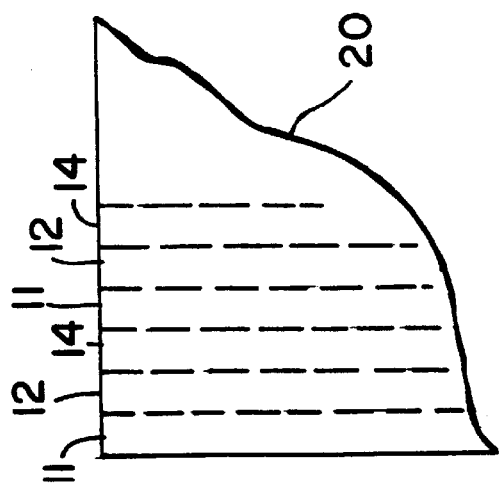
FIG. 2 is a detail of an output produced by the embodiment of FIG. 1.

The resulting output image file 20, as shown in FIG. 2, is stored on a hard disk drive 19 of the computer 8 shown in FIG. 1. The output image file 20 contains regions 11, 12, and 14 which each correspond to a portion of the data from the input image files 1, 2, and 4, respectively. The output image file 20 is then printed using a standard laser printer 18 as shown in FIG. 1. The resulting output 20 is graphically equivalent to the output image file as shown in FIG. 2. Alternatively, the output image file could be printed on a computer-driven slide printer or a motion picture printer.

Figure 3:
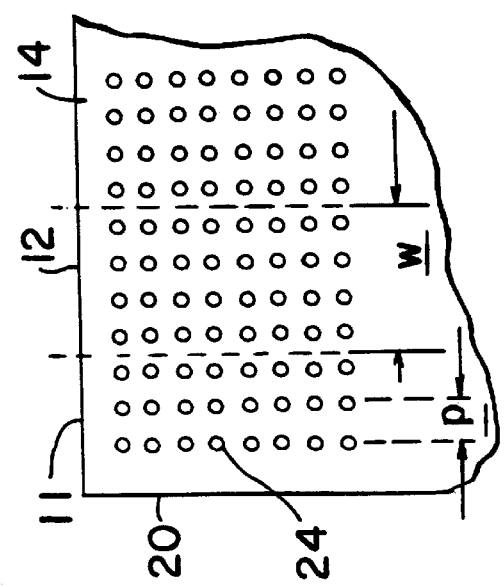
FIG. 3 is a microscopic detail of the output in the embodiment of FIG. 2.

FIG. 3 shows a microscopic view of the output 20, in which a distance p corresponds to the distance between pixels 24 of the computer printer 18. For many common laser printers this distance will be 1/300 inches. Distance w corresponds to the width of the regions 11, 12, and 14. The width w of these regions is an integer multiple greater than one of the distance p between laser printer pixels, such that each of the image regions 11, 12, 14 is formed by two or more lines of printer pixels 24.

Figure 4:
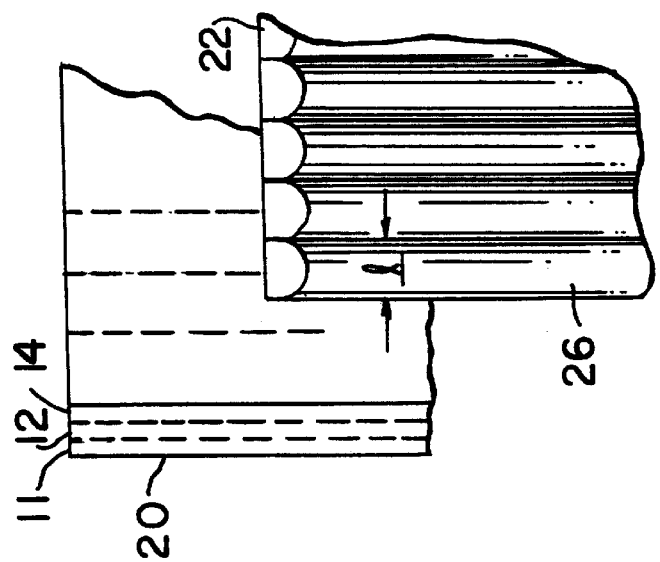
FIG. 4 is a representation of the lenticular sheet and output of the embodiment of FIG. 1.

FIG. 4 is a view showing the output 20 in conjunction with a lenticular sheet 22. Again, the distance w corresponds to the width of the regions 11, 12, and 14. The distance l corresponds to the width of each lenticule 26 on the lenticular sheet 22. If, for example, the output image file contains three views of the subject 1, 2, 4, then the width l of the lenticule 26 will correspond to three times the width w of each image region 11, 12, 14, so that the width of each lenticule 26 will cover one narrow, rectangular field 11, 12, 14 of each of the input image files 1, 2, 4. Because the compression ratio of the segments of the input image files 11, 12, 14 equals the reciprocal of the number of input image files, the resulting output will have the same aspect ratio as each of the original input image files 1, 2, 4.

Figure 5A:
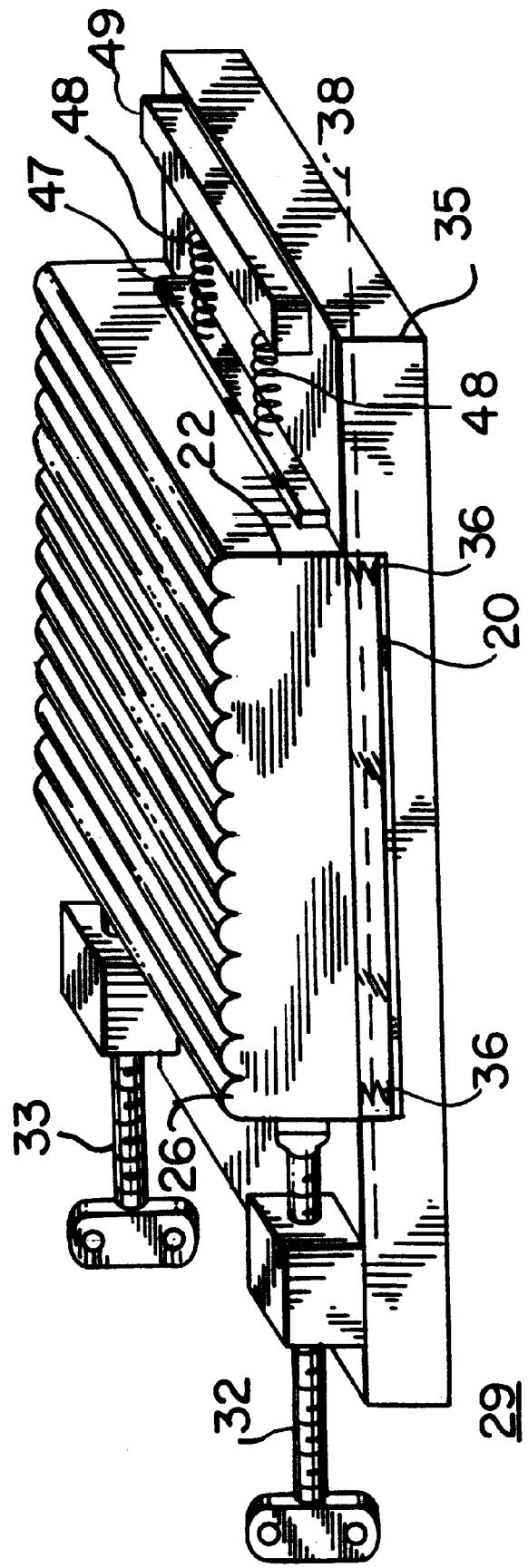
FIG. 5 is a view of an alignment frame of the embodiment of FIG. 1.

FIG. 5 shows an alignment apparatus 29 for positioning the lenticular sheet 22 relative to the output 20. The output 20 rests in a recess in the frame 35 and is held in place by retaining springs 36. The lenticular sheet 22 is in contact with the output 20, so that the output 20 is at the focal plane 38 of the lenticules 26 of the lenticular sheet 22.

Two micrometer screws 32, 33 are used to adjust the position of the lenticular sheet 22 relative to the output 22 by compressing springs 48 against a block 49. Turning the screws 32, 33 in unison moves the lenticular sheet 22 laterally and turning them individually rotates the lenticular sheet 22 relative to the output 20. Micrometer screws 32, 33 are adjusted until the lenticules 26 are parallel to and aligned with the image regions 11, 12, 14.

FIGS. 6(a) and 6(B) show an alternative alignment device for the present embodiment. Here a number of sheets of output 20 are bound together in a book 320. The book 320 is held on a plate 335 by a frame 318. The position of the frame 318 relative to the plate 335 can be adjusted by micrometer screws 332, 333 that force the frame 318 to compress springs 308 against a block 309. A lenticular sheet 322 is connected to a bracket 327 by a hinge 346. The bracket 327 passes through holes 316 in the plate 335 and is connected to a lower plate 340. Catchments 341 pass through holes 314 in the plate 335 and are also connected to the lower plate 340.

The lenticular sheet 322 rotates about the hinge 346 and closes down on top of the book 320 of output sheets 20 as shown in FIG. 6b. The catchments 341 secure the front edge of the lenticular sheet 322 to the lower plate 340, while the hinge 346 and bracket 327 secure the rear edge of the lenticular sheet 322 to the lower plate 340. Springs 347 separate the plate 335 and lower plate 340 and force the top-most image 20 of the book of images 320 against the lenticular sheet 322.

Micrometer screws 332, 333 are adjusted to position the book 320 relative to the lenticular sheet 322 so that the image regions 11, 12, 14 are parallel to and aligned with the lenticules 26 of the lenticular sheet 322, as discussed in reference to FIG. 4.

FIGS. 7(a) and 7(b) show another alternative adjustment device for the present embodiment. FIG. 7(a) shows the alignment and viewing apparatus for a collection of images 20 on a continuous scroll 420. FIG. 7(b) shows a section of the scroll 420 containing images 20 and alignment marks 416, 418.

As shown in FIG. 7(a), the scroll 420 is held on a feed reel 441. The scroll 420 passes over an inlet roller 446 and then passes between a plate 435 and a lenticular sheet 422. The sheet 420 then passes over an outlet roller 447 and is taken up by a take-up reel 440.

The feed reel 441 and the take-up reel 440 are driven by motors 412 and 411 via belts 410 and 409, respectively. Optical position sensors 417 and 419 monitor the position of the alignment marks 416,418. The controller 415 positions images 20 relative to the lenticular sheet 422 by actuating the motors 412, 411 in response to signals from the position sensors 416, 418.

The controller determines the positional error between the lenticular sheet 422 and an image 20 and adjusts the position of the image 20 so that image areas 11, 12, 14 are aligned with the lenticules 26 of the lenticular sheet 422, as discussed with reference to FIG. 4.

One corner of the lenticular sheet 422 is fixed by a bracket 448. The position of the opposite corner of the lenticular sheet is adjusted by a micrometer screw 449. Turning the micrometer screw 449 adjusts the angular position of the lenticular sheet 422 relative to the scroll 420 so that the lenticules 26 of the lenticular sheet 422 can be made parallel to the image regions 11, 12, 14.

Figure 8D:
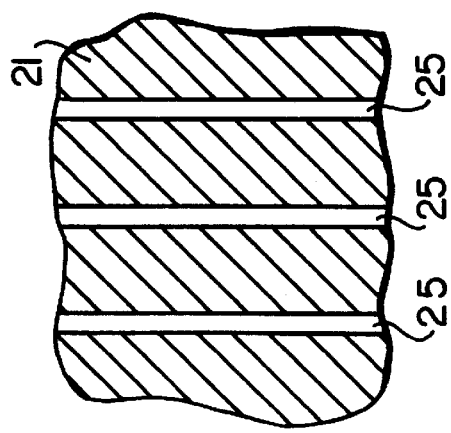
FIGS. 8(a) and 8(b) represent an alternative viewing apparatus for the embodiment of FIG. 1.

FIGS. 8(a) through 8(d) show an alternative viewing apparatus that may be used to view the three-dimensional encoded image 20 produced by this embodiment. The image 20, shown in FIG. 8(a) is the same as that shown in FIGS. 2, 3 and 4. Disposed across the front of the image 20 is a parallax barrier sheet 21 that is separated from the image by a distance G.

Toward the right side of the image 20, a viewer 9 sees image regions 11 that represent the right side parallax angle view of the scene. At the center of the image 20 the viewer 9 sees regions 12 that represent the central parallax angle view of the scene. Toward the left side of the image 20 the viewer 9 sees the left side parallax angle view of the scene.

Figure 8C:
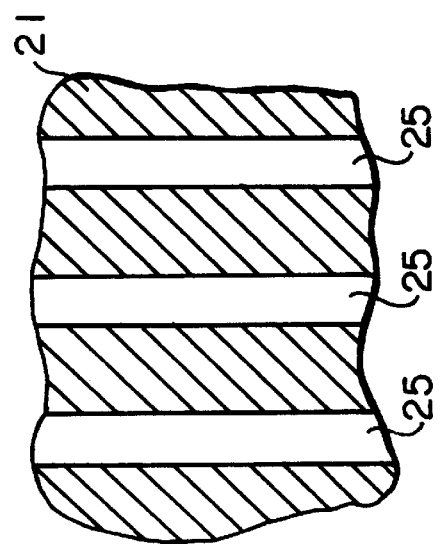
Figure 8B:
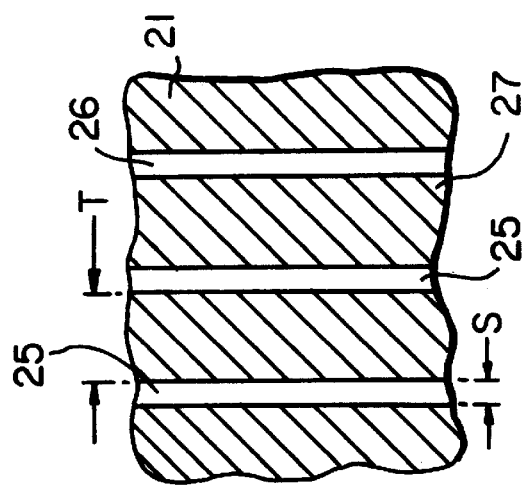

FIGS. 8(b) through 8(c) show detailed views of the parallax barrier sheet. As shown in FIG. 8(b), transparent regions 25 of widths S are separated by opaque regions 27. FIGS. 8(b), 8(c) and 8(d) represent portions of the parallax barrier sheet 21 at the right side, center, and left side of the sheets, respectively. The right side and left side portions of the parallax barrier sheet 21 in FIGS. 8(b) and 8(c), respectively, have narrower transparent regions 25 compared with the central region in FIG. 8(c).

By selecting the width of the transparent regions 25 across the parallax barrier sheet 21, the viewer 9 will see only the appropriate parallax angle views 11, 12, 14 across the image, as shown in FIG. 8(a) using the equally sized image regions 11, 12, 14 shown in FIGS. 2, 3, and 4.

FIG. 9 shows a second embodiment of the present invention, in which a subject 46 is viewed by anamorphic lenses 44, 54 and 64. The anamorphic lenses 44, 54, 64, are coplanar and are separated from each other to provide multiple, parallax angle views of the subject 46. The images formed by the anamorphic lenses 44, 54, 64 are focused on a lenticular sheet 23. Photographic film 40 is pressed against the back side of the lenticular sheet 23 by rollers 42 so that the film 40 is at the focal plane 38 of the lenticular sheet 23. The film 40 is exposed with the multiple, parallax views of the subject 46 and processed by conventional means.

FIG. 10 shows the processed film 40 loaded into a photographic enlarger 43 to produce a print 30, and FIG. 11 shows a detailed view of the print 30. Regions 31, 32, and 34 correspond to areas on the film 40 which were exposed with views of the subject by anamorphic lenses 44, 54, and 64 respectively.

FIG. 12 shows a detailed view of a lenticular sheet 22. The width of the lenticules 26 of the lenticular sheet is shown at l. The enlargement ratio of the enlarger 43 is selected so that the width w of the regions 31, 32, and 34 are each a reciprocal of the number of views taken times the width l of a lenticule 26 of a lenticular sheet 22. As in the first embodiment, each lenticule 26 of the lenticular sheet 22 covers one set of segments 31, 32, 34 of the complete image of the subject. Alternatively, the print 30 could be produced by contact printing from the film 40, that is, with an enlargement ratio of 1:1. In that case, the lenticular sheet 22 used to view the print would be identical to the lenticular sheet 23 used to expose the film in FIG. 8.

The print 30 is then developed using a conventional process and the resulting finished print 30 is aligned with the lenticular sheet 22 using the apparatus shown in FIGS. 5, 6(a) or 7(a).

Figure 13:
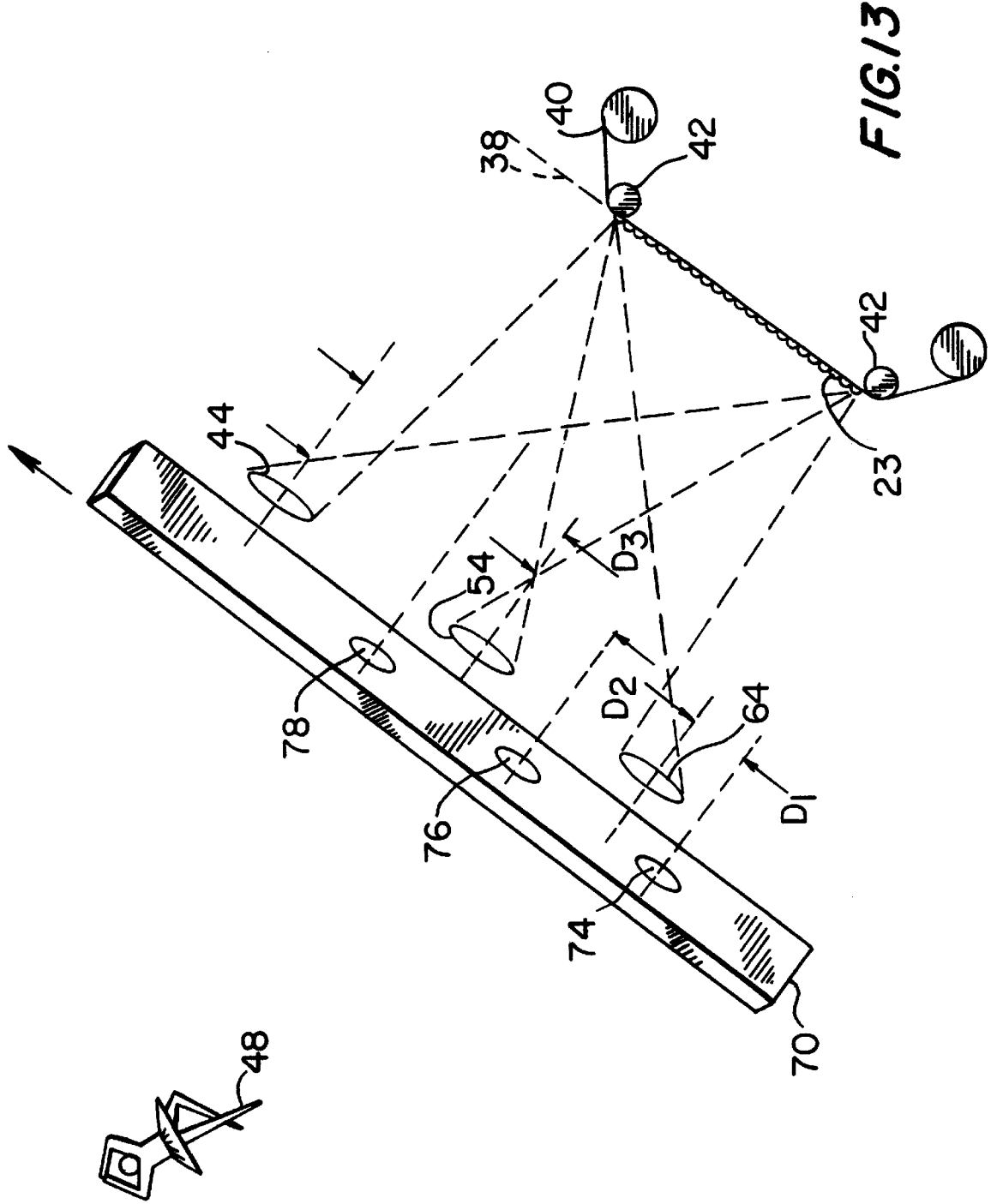
FIG. 13 is a representation of an alternative to the embodiment shown in FIG. 9.

FIG. 13 shows a shutter arrangement that can be used with the present embodiment to produce a three dimensional animated image. Here, an opaque shutter 70 covers each of the anamorphic lenses 44, 54, 64. The shutter 70 can be moved in the direction indicated in FIG. 13. Distances $D_1$, $D_2$ and $D_3$ separate the center of each anamorphic lens 64, 54, 44 from corresponding holes 74, 76, 78 in the shutter. The distances are selected so that $D_1<D_2<D_3$. If the shutter 70 is moved at constant speed in the direction shown in FIG. 13, lens 64 will capture an image through hole 74 from the left-most parallax view first. The other lenses 54, 44 will remain covered. Some time later lens 64 will be covered with an opaque region of the shutter 70 and lens 54 will capture an image through hole 76 from the center parallax view. Some time after that, lens 54 will be covered and lens 44 capture an image from the right-most parallax view through hole 78. If the subject is moving, then each parallax angle view will capture the subject in a slightly different position.

These parallax views will each be focused on the lenticular sheet 23 as described above. The multiple, time-sequenced views will be parsed and compressed by the lenticular sheet 23.

The film 40 is then processed and aligned with a viewing lenticular sheet 22 as described in the above embodiment.

The viewer will see a three dimensional image that will appear to move as the viewer's viewpoint moves across the image.

Figure 14:
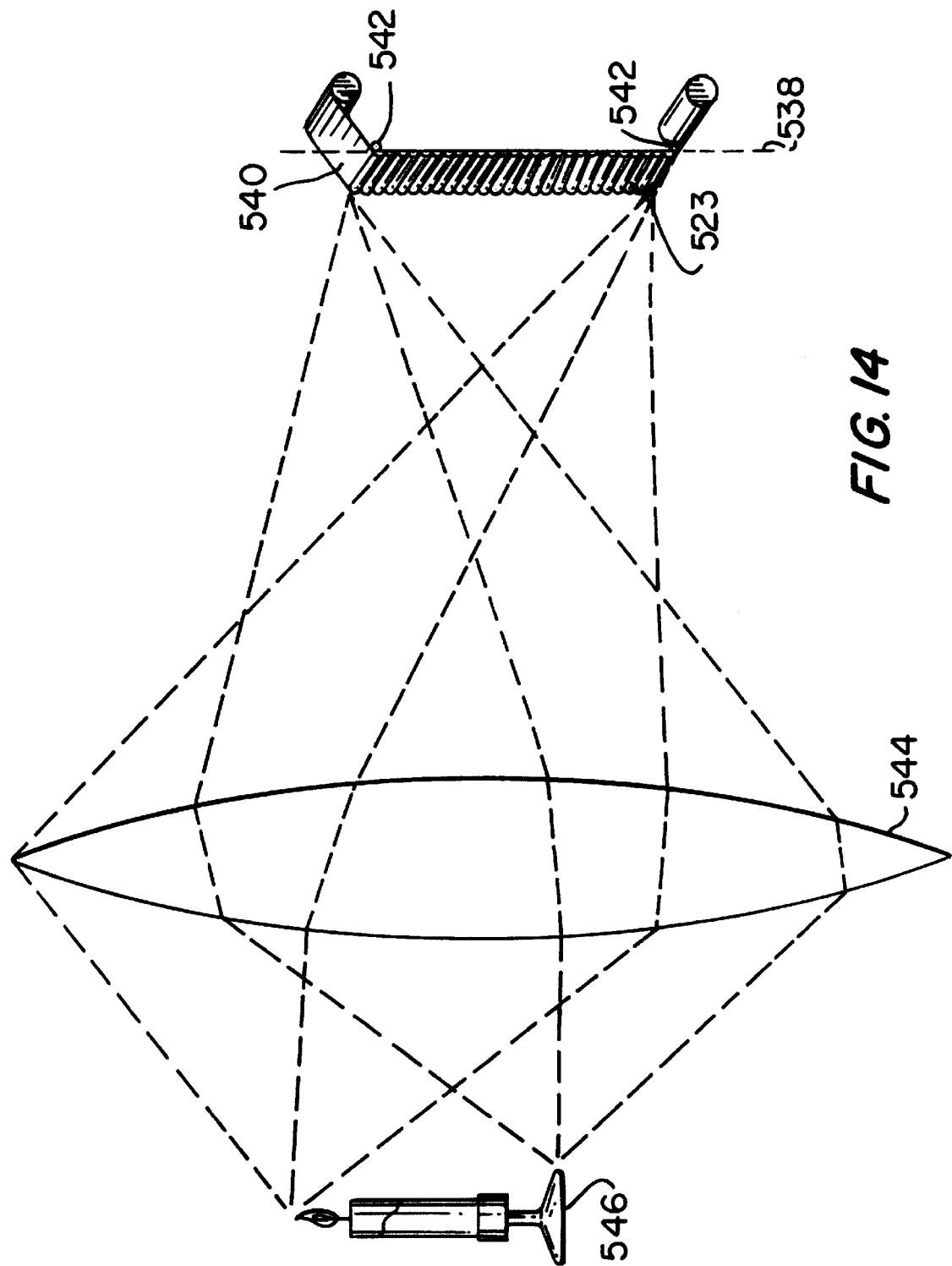
FIG. 14 is a representation of another alternative to the embodiment shown in FIG. 9.

FIG. 14 shows an other alternative construction to this embodiment where a large diameter (greater than 5 inches) lens 544 focuses an image of an object 546 onto a lenticular sheet 523. Photographic film 540 is held at the focal plane 538 of the lenticular sheet 523 by rollers 542.

The exposed image on the film 540 beneath each lenticule 26 of the lenticule sheet 22 as shown in FIG. 12, will be of a continuum of positions across the width of the lens 544.

The film 540 is then processed and aligned with a viewing lenticular sheet 22 as described in the above embodiment.

In another alternative to this embodiment, shown in FIG. 15, a single parallax view of the object 546 is selected by a slit 550. A shutter (not shown) is opened to expose the film 540. The shutter is then closed and the slit 550 is moved, as shown in FIG. 15, to select another parallax angle view. This view is then exposed on the film 540 by again opening the shutter. This process is repeated to capture a desired number of discrete parallax views of the screen.

The film 540 is then processed and aligned with a viewing lenticular sheet 22 as described in the above embodiment.

The animated image produce using the embodiments shown in FIGS. 13 and 14 may be combined with the alignment apparatus shown in FIG. 7(a). The film 40 shown in FIG. 13 is processed by conventional means to produce the scroll 420 shown in FIG. 7(a). The drive motors 411, 412 move the scroll 420 beneath the lenticular sheet 422.

As time encoded image segments captured on the scroll 420 pass beneath each lenticule 426 of the lenticular sheet 422, a stationary observer will see an animated image of the captured scene. If the scroll 420 is caused to move more than the width of one lenticule 426 then the stationary observer (not shown) will see the animated sequence repeat as the sequence of captured images passes beneath each subsequent lenticule 426.

Alternatively, the motors 411, 412 may reverse the motion of the scroll 420 and cause the sequence of captured images to be displayed in reverse order as the scroll 420 returns to its original position.

This embodiment has been described in terms of capturing a single object or scene in motion from a sequence of paralox views. The same technique may be used to capture completely separate and distinct images and record them on a single photographic image.

The moving shutter 70 in FIG. 13 may be moved in steps, rather than continuously and the object photographed 48 may be replaced with another object for each sequential exposure.

The resulting image, when aligned with a lenticular sheet will allow observers of different angles to see a separate and distinct scene. Alternatively, motion provided by the apparatus shown in FIG. 7(a) could be used to display a series of distinct scenes to a stationary observer. Such a device would be applicable to an advertising billboard that can display a number of separate images sequentially.

Figure 16:
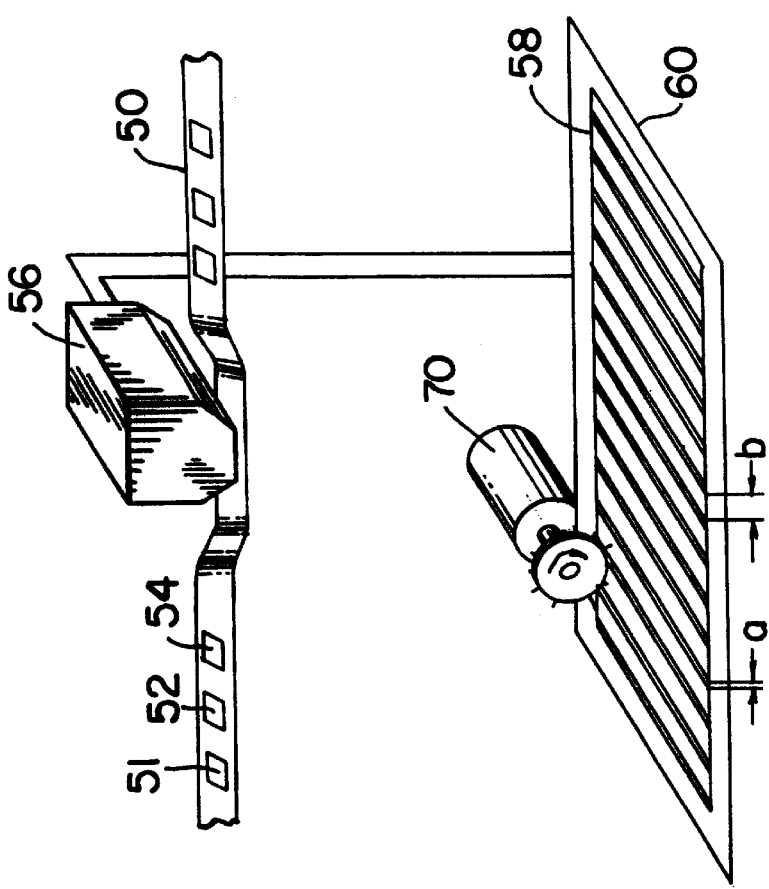
FIG. 16 is a representation of a third embodiment according to the present invention.

FIG. 16 shows a third embodiment of the present invention, in which multiple parallax views of the same subject 51, 52, 54 are taken sequentially on the same strip of photographic film 50. The film is loaded into a photographic enlarger 56, and a line-screen mask 58 is placed above the photographic paper 60.

Figure 17:
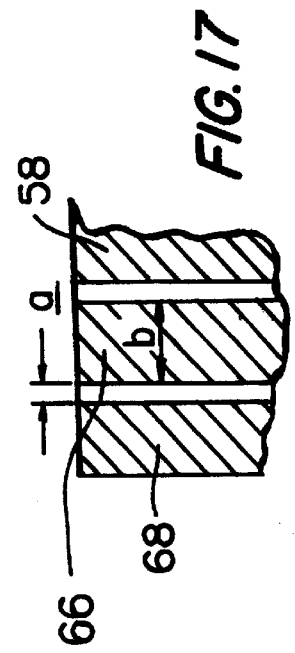
FIG. 17 is a detailed view of a mask used in the embodiment of FIG. 16.

FIG. 17 shows a detailed view of the line-screen mask 58, in which narrow, rectangular, transparent regions 66 of width a are separated by opaque regions 68 of width b. The width a of the transparent regions 66 of the line-screen mask 58 is the reciprocal of the number of views of the subject 51, 52, 54 times the width l of the lenticules 26 of the lenticular sheet 22 shown in FIG. 12. The width b of the opaque regions 68 is equal to the width l of the lenticules 26 of the lenticular sheet 22 minus the width a of the transparent regions 66 of the line screen mask 58, so that the spatial frequency of the line-screen mask 52 equals the spatial frequency of the lenticular sheet 22. The line screen mask 58 is placed over the photographic paper 60 and the first of the parallax views of the subject 51 is exposed. The line screen mask 58 is then moved a distance a laterally by a stepper motor 70. The next parallax view of the subject 52 is exposed. The process is repeated until all the parallax views of the subject 51, 52, 54 are exposed and the mask has been moved a distance l.

Figure 18:
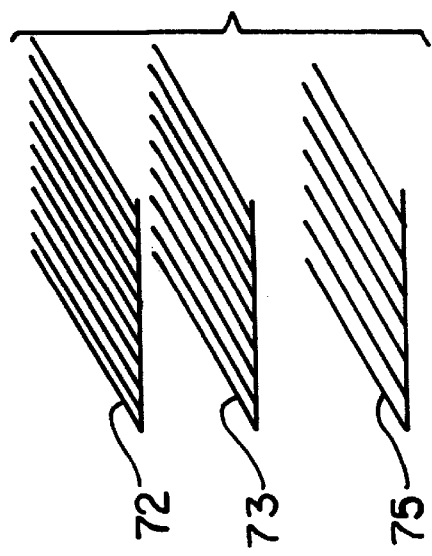
FIG. 18 shows an alternative set of masks used in the embodiment of FIG. 16.

Alternatively, instead of moving the mask 58 to expose each of the parallax views of the subject, a series of masks 72, 73, 75, as shown in FIG. 18, each corresponding to a different respective parallax angle view of the subject 51, 52, 54 are used. The photographic paper 60 is exposed though each mask with its corresponding parallax view image. The photographic paper 60 is then developed using conventional means and the resulting print 20 is aligned with a lenticular sheet 22 in the manner shown in FIGS. 5, 6 or 7(a).

Figure 19:
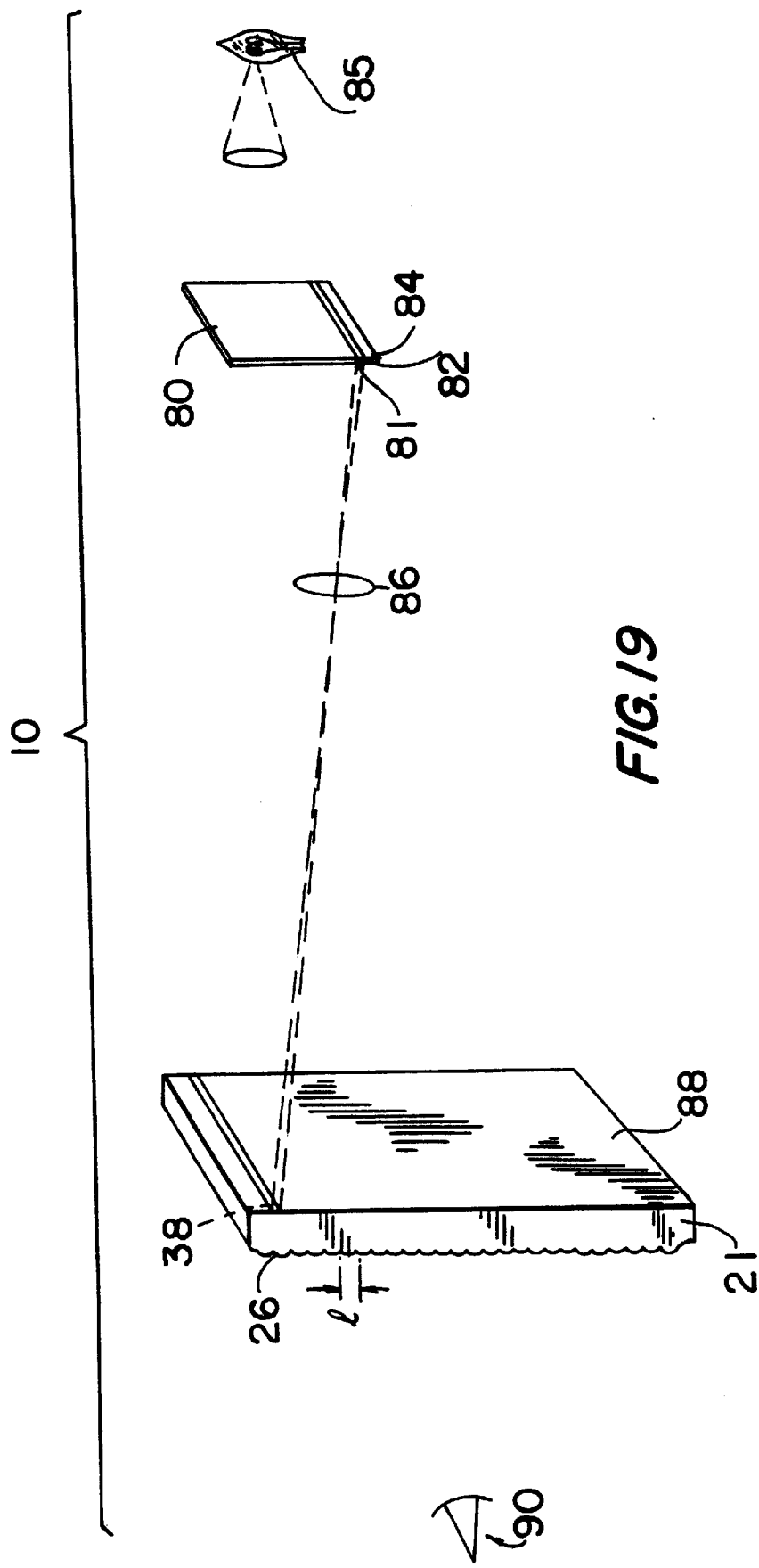
FIG. 19 is representation of a fourth embodiment according to the present invention.

FIG. 19 shows a fourth embodiment of the present invention, in which a transparent print 80, such as a photographic slide or motion picture frame, is made by combining multiple parallax views of a subject using one of the methods of the first three embodiments. A light source 85 projects light through the transparent print 80, and a lens 86 focuses the transmitted light onto a dispersive surface 88, such as a sheet of frosted glass. The dispersive surface lies at the focal plane 38 of a lenticular sheet 22. The magnification of the lens 86 is selected so that the width of images projected by segments 81, 82, 84 of the parallax angle views of the subject onto the dispersive surface 88 are equal to the reciprocal of the number of parallax views of the subject times the width l of the lenticules 26 of the lenticular sheet 22. A three-dimensional image appears when the dispersive surface 88 is viewed through the lenticular sheet 22 by an observer 90.

Using appropriate shutter and film transport mechanisms (not shown), the transparent print 80 can be rapidly substituted for a next sequential print to produce a three dimensional motion picture.

Figure 20:
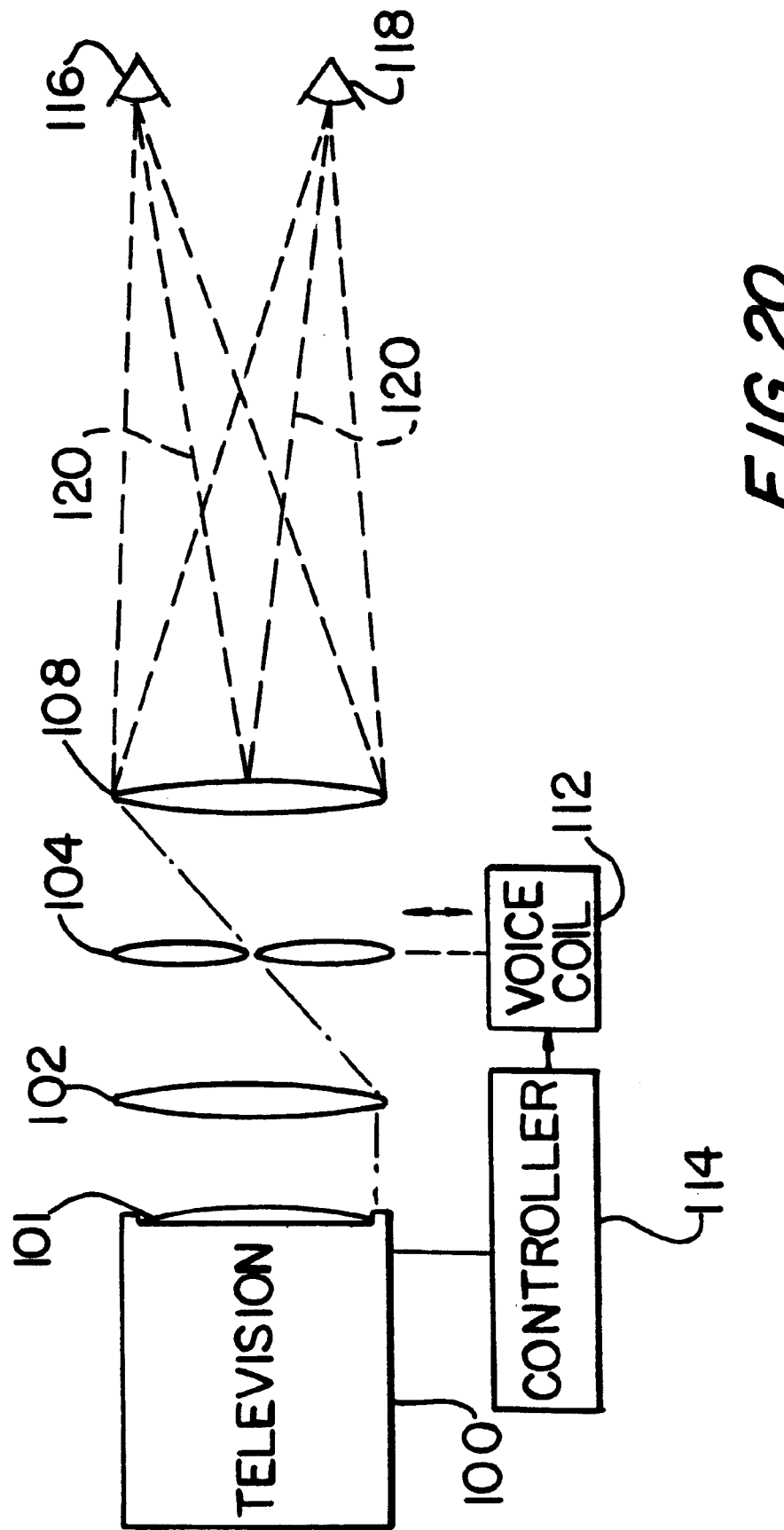
FIG. 20 is a representation of a fifth embodiment according to the present invention.

FIG. 20 shows a fifth embodiment of the present invention, in which a television 100 displays time multiplexed images of a scene from multiple parallax angles. A first lens 102 is placed in front of the television screen 101. Light focused by the lens 102 passes through a slit 104 and then through a second lens 108. The slit 104 is placed at the focal point of the two lenses 102, 108. Light exiting the second lens 108 is viewed by a viewer's right eye 116 and left eye 118. The slit 104 is connected to a voice coil 112 that is controlled by a controller 114.

The controller 114 causes the voice coil 112 to move the slit 104 across the axis of the lenses 102, 108 so that the optical axis 120 of the lenses 102, 108 is shifted. When the television 100 displays a right-eye view of a scene, it sends a signal to the controller 114 to operate the voice coil 112 to move the slit downward, as shown in FIG. 19, displacing the optical axis 120 upward and directing the displayed image toward the viewer's right eye 116. When a left-eye view of a scene is displayed, the slit 104 is moved upward and the image is directed toward the viewer's left eye 118.

Figure 21:
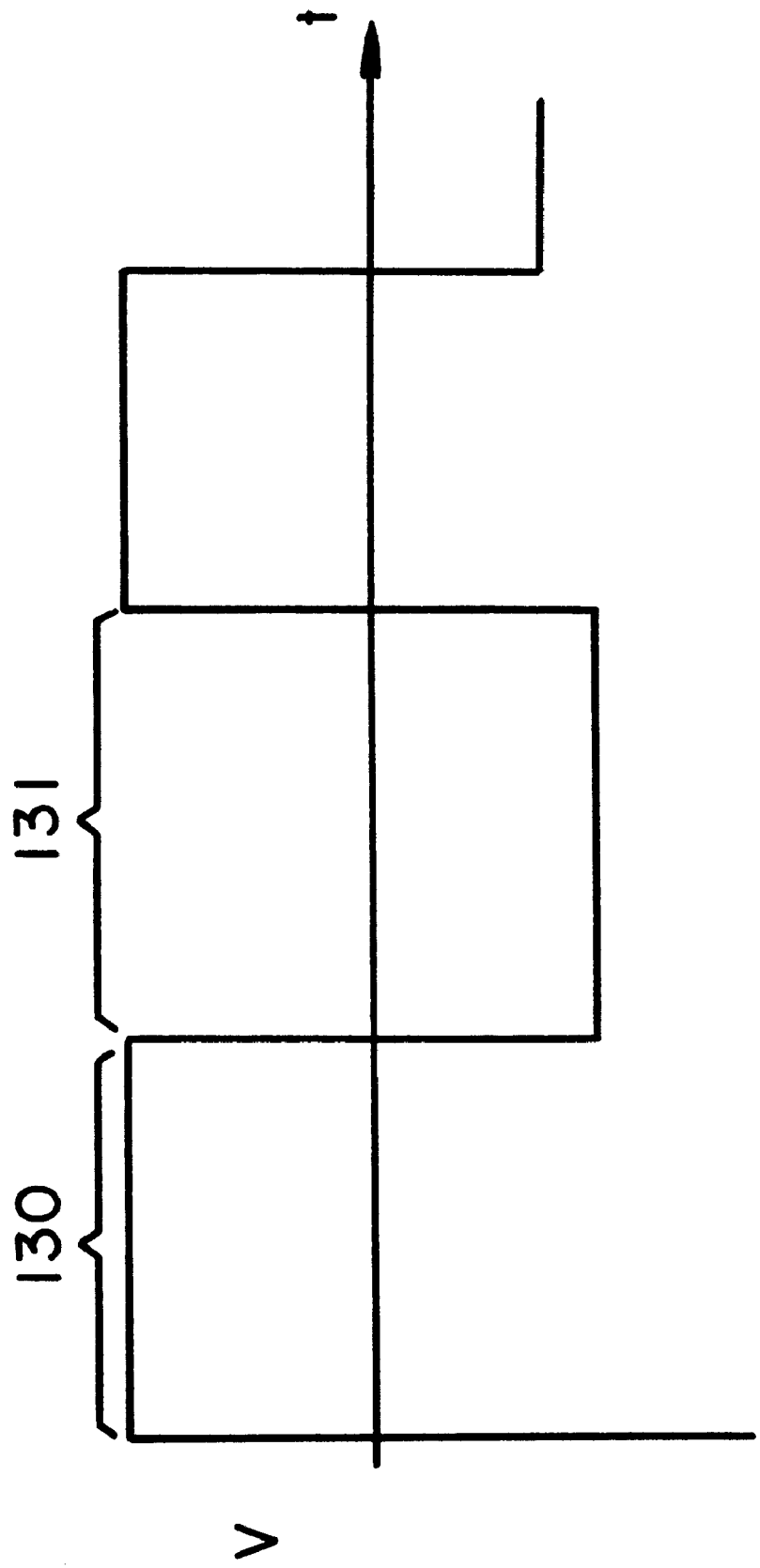
FIG. 21 is a representation of a waveform used in conjunction with the embodiment shown in FIG. 20.

FIG. 21 shows a voltage waveform used to drive the voice coil 112. Right-eye views are displayed by the television 100 during interval 130 and left-eye views are displayed during interval 131.

The width of the slit 104 determines the angle through which a viewer can see a given displayed parallax view. Typically, the width of the slit 104 is chosen so that the viewer's right eye will see only right-eye images and his left eye only left-eye images. Because the angle subtended by the viewer's eyes varies with the viewing distance, an adjustment to the slit width is desirable.

The waveform shown in FIG. 22 allows the effective slit width to be modulated electronically. Rapid variation of the position of the slit 104 about a selected position will cause the viewer to view an image over a wider angle because the viewer's persistence of vision will tend to integrate the image over time. The ripple component 115 rapidly varies the slit position about the right-eye and left-eye viewing positions. By varying the amplitude of the ripple component 115, the viewer can adjust the viewing angle for each eye and optimize the three dimensional effect for a given viewing distance.

Figure 23:
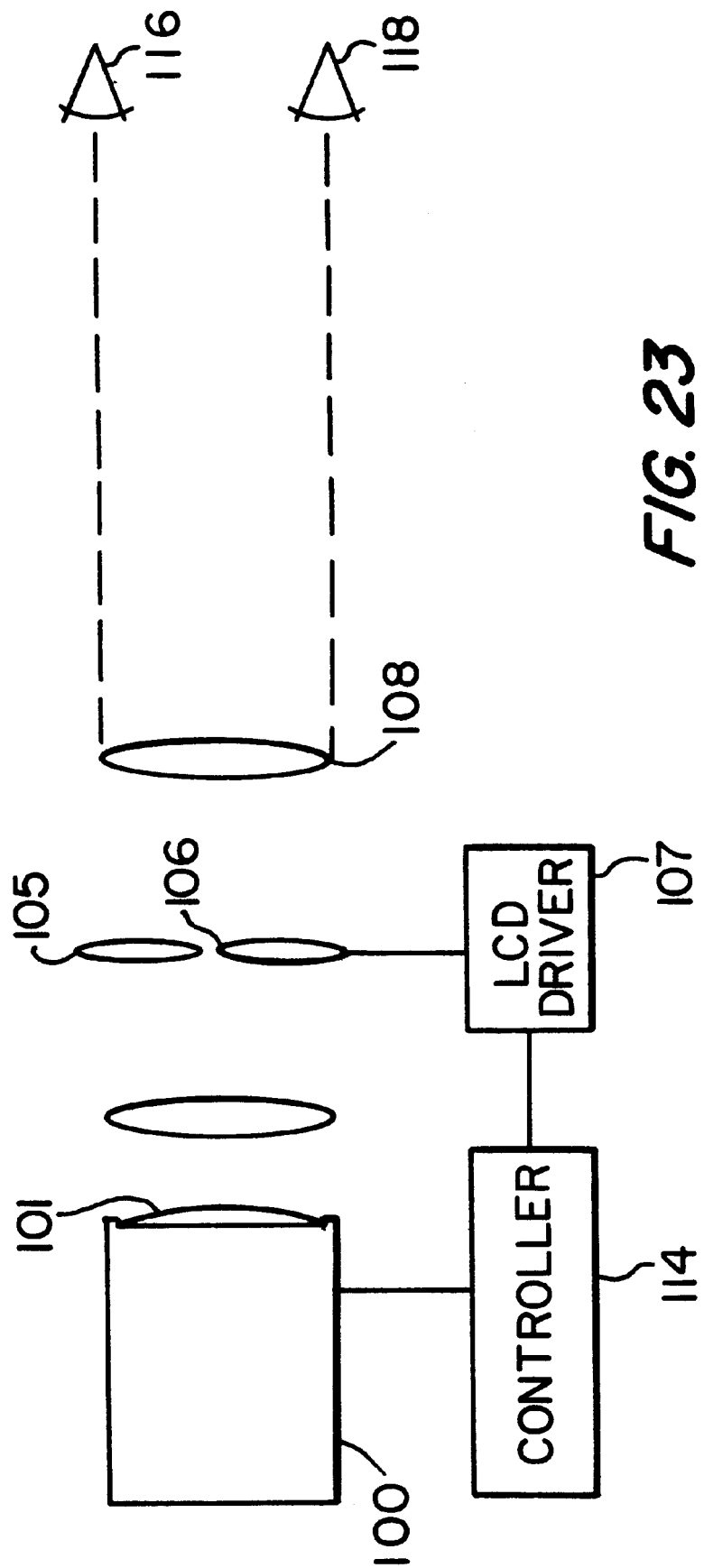
FIG. 23 is a representation of an alternative to the embodiment shown in FIG. 20.

An alternative to this embodiment is shown in FIG. 23. Here the mechanical slit 104 and voice coil 112 are replaced with a liquid crystal (LC) panel 105 and an LC Driver 107. The LC driver 107 causes a clear region 106 to appear across the LC. The position of the clear region 106 directs the resulting image to the right eye 118 or left eye 116.

Alternatively, this embodiment as shown in FIGS. 20 or 23, may be used to generate an auto-stereo image, where the three-dimensional image varies as the viewer's viewpoint moves across the image. This produces the effect of allowing the viewer to "walk around" the subject, as in a hologram. The signal driving the voice coil 112 may be modulated in such a way that the slit 104 selects a number of parallax angle views of a subject across a wider angular range than the left- and right-eye views described above. In synchrony with the position of the slit 104, the television 100 displays corresponding parallax views of a subject.

A sufficiently large number of closely-spaced parallax angle views are presented so that the viewer 116, 118 has the illusion of a continuous, auto-stereoscopic image.

FIG. 24 shows an example of a voltage waveform used to drive the voice coil 112. Each voltage step 110 in FIG. 23 occurs in synchrony with a next parallax image view on displayed on the television screen 101. In the example shown in FIG. 21, sixteen voltage steps 110 shown on the waveform correspond to sixteen parallax angle views displayed on the television screen 101.

This alternative may also be applied where a large number of parallax views are displayed to create an auto stereo image as discussed with reference to FIG. 19(a).

Figure 25:
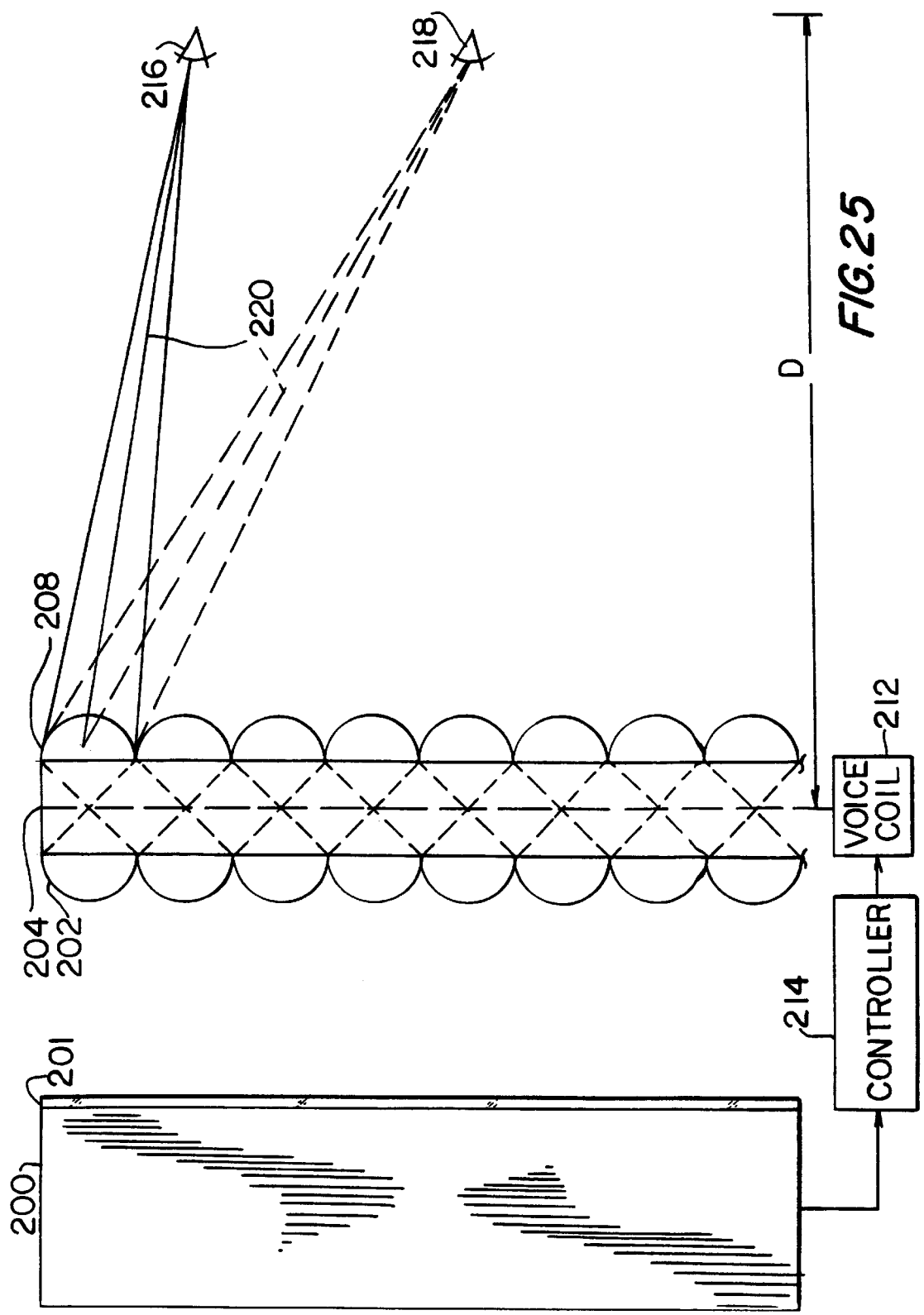
FIG. 25 is a representation of a sixth embodiment according to the present invention.

FIG. 25 shows a sixth embodiment of the present invention in which a television 200 displays time-multiplexed parallax views of a scene as in the preceding embodiment. Light from the television screen 201 passes through a first lenticular sheet 202, through a line screen mask 204, and through a second lenticular sheet 208. The focal lengths and positions of the lenticular sheets 202, 208 are chosen so that their focal points coincide as in the preceding embodiment. The line screen mask is placed at the focal point of the lenticular sheets 202,208. The line screen mask 204 is positioned by a voice coil 212 and controller 214 as in the above embodiments. The line screen mask 204 is positioned to direct the optical axis 220 of each of the lenticules of the second lenticular sheet 208 toward either the right eye 216 or left eye 218 positioned at a viewing distance D depending on the parallax view currently displayed on the television screen 201.

By adjustment of the focal lengths of the lenticular sheets 202, 208 and the separation between the sheets 202, 208 and the television screen 201, the stereoscopic effect can be optimized for a given viewing distance. Alignment of the lenticules of the two lenticular sheets 202, 208 with pixels of the television screen 201 is not necessary.

FIG. 26 shows an apparatus for producing the line screen mask 204. A lenticular sheet 244, identical to the lenticular sheets 204, 208 is placed above a photographic emulsion covered plate 204. Light from a point source of light, for example from a photographic enlarger 242, is directed toward the lenticular sheet 244 from a distance D equal to the viewing distance. The emulsion covered plate 204 is then developed by conventional means so that areas exposed by light focused by each of the lenticules of the lenticular sheet 244 are transparent, while the intervening spaces are opaque. Lenticules away from the center of the sheet will produce clear slits at a point offset from their optical axis. The offset will be proportional to the distance D and the distance of each lenticule from the center of the sheet.

FIGS. 27(a) through 27(e) illustrate a seventh embodiment of the present invention wherein a viewer 816 observes a computer generated three-dimensional encoded image 820 through a lenticular sheet 822. Three regions of the image E, C and F correspond to the left-most, center, and right-most portions of the image 820. The viewing angle A introduces a parallax error toward the edges E, F of the image 820 that becomes more severe as the viewer 816 comes closer to the image 820.

FIG. 27(e) illustrates the effects of a severe viewing angle A' on an encoded image 820 viewed through a lenticular sheet. Encoded image regions 820K, 820L and 820M represent right, center and left parallax image views of a scene respectively. Angular regions K, L and M represent the regions in which views 820K, 820L and 820M are visible. For large angles A', no portion of the image 820 is visible through the lenticule 26. As a result, the viewer 816 will observe blank areas toward the edges of the image as the viewing distance D diminishes.

Figure 27A:
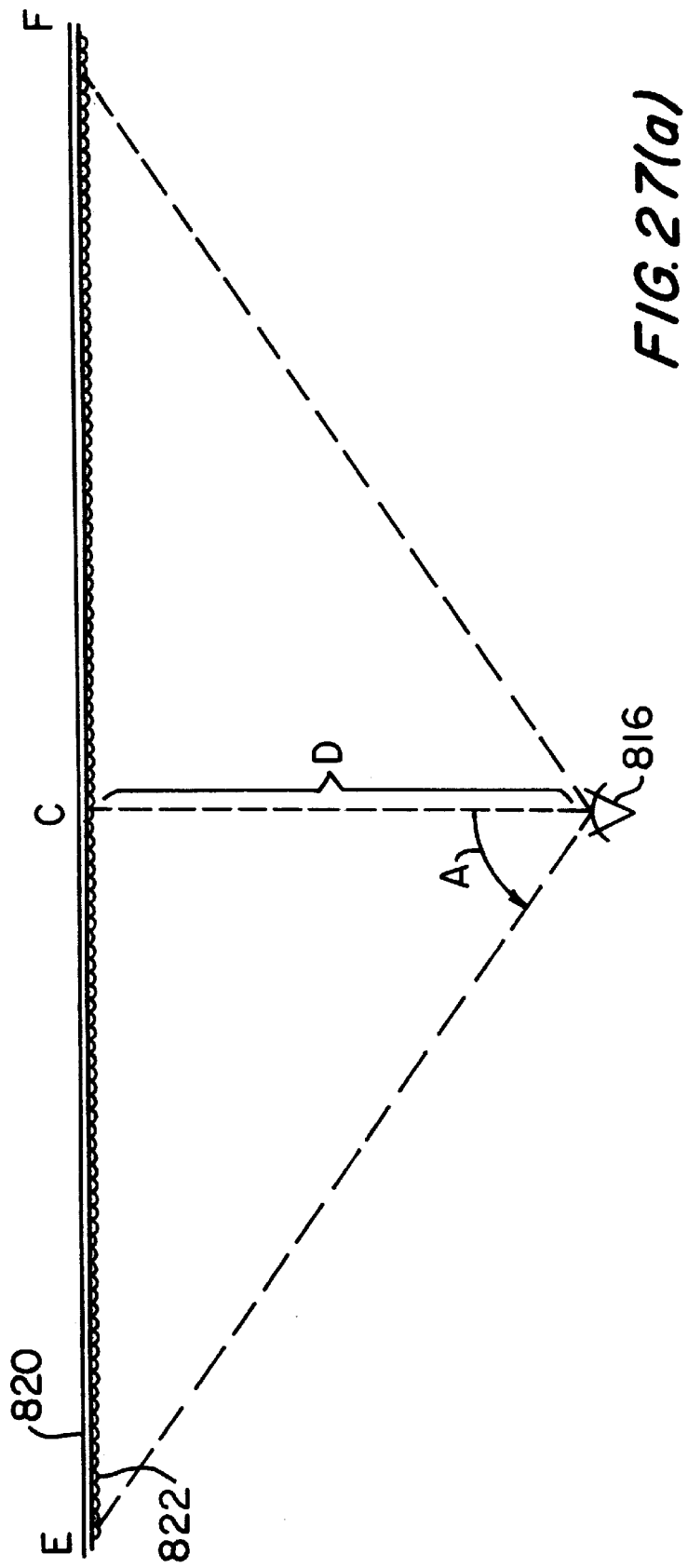
Figure 27B:
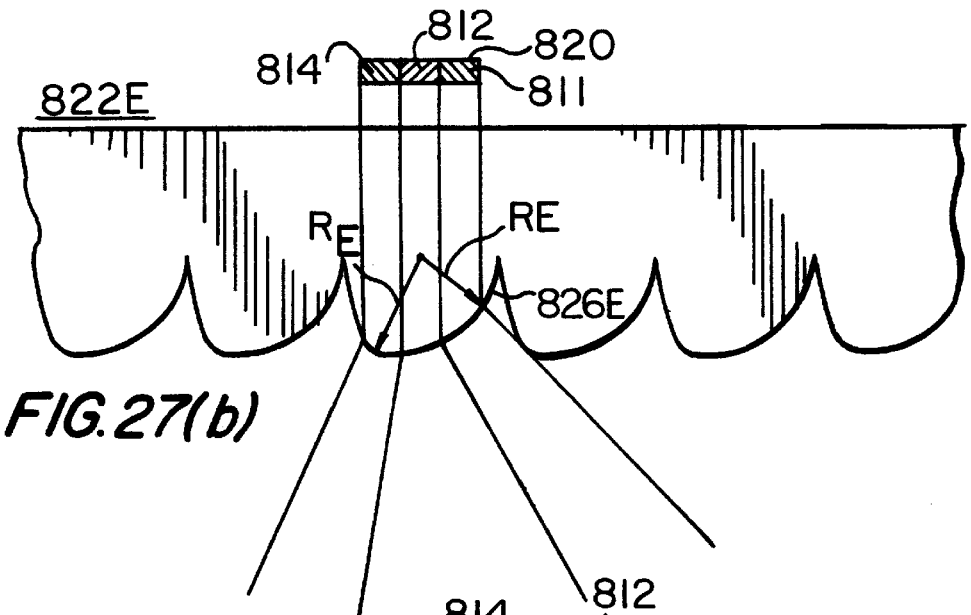

FIGS. 27(b), (c) and (d) represent a detailed view of a lenticular sheet made according to this embodiment of the present invention. FIG. 27(b) represents a detailed view of left lenticules 826 of the lenticular sheet 822 toward the left edge of the image. Radius $R_E$ is the radius of curvature of the right side of lenticule 826E. Radius $R'_E$ is the radius of curvature of near the center of lenticule 826E. The radius of curvature of the lenticule 826E is varied continuously from $R_E$ to $R'_E$ in such a manner that the angle through which the left-edge parallax encoded view 811 is extended over a wider viewing angle. Thus, the viewer 816 continues to see an image toward the left edge of the image sheet 822E at a more severe viewing angle A, than with a standard lenticular sheet.

Figure 27C:
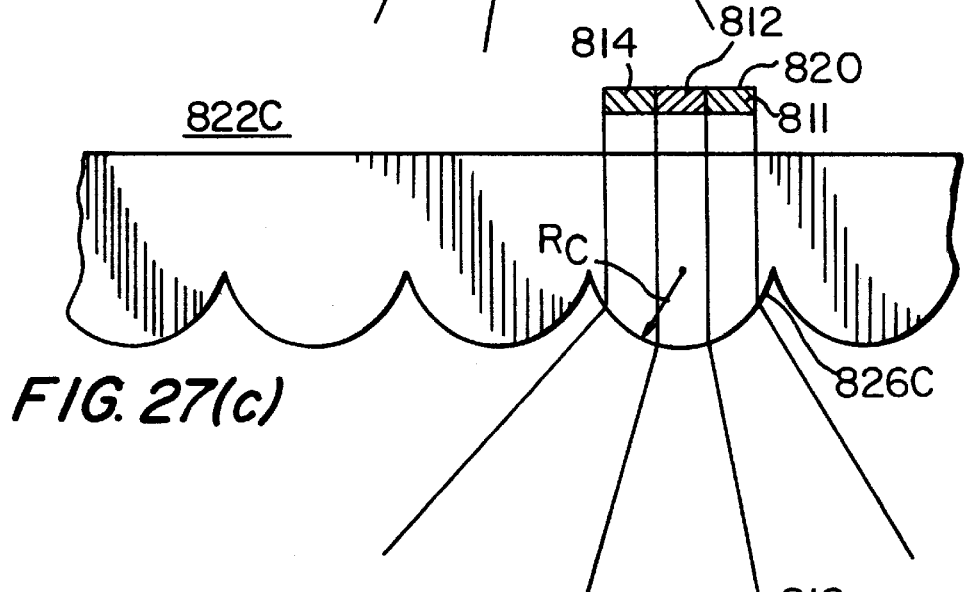

FIG. 27(c) shows the radius of curvature $R_C$ for a lenticule 826C near the center of the lenticular sheet 822C. Here the radius is constant across the whole lenticule.

Figure 27D:
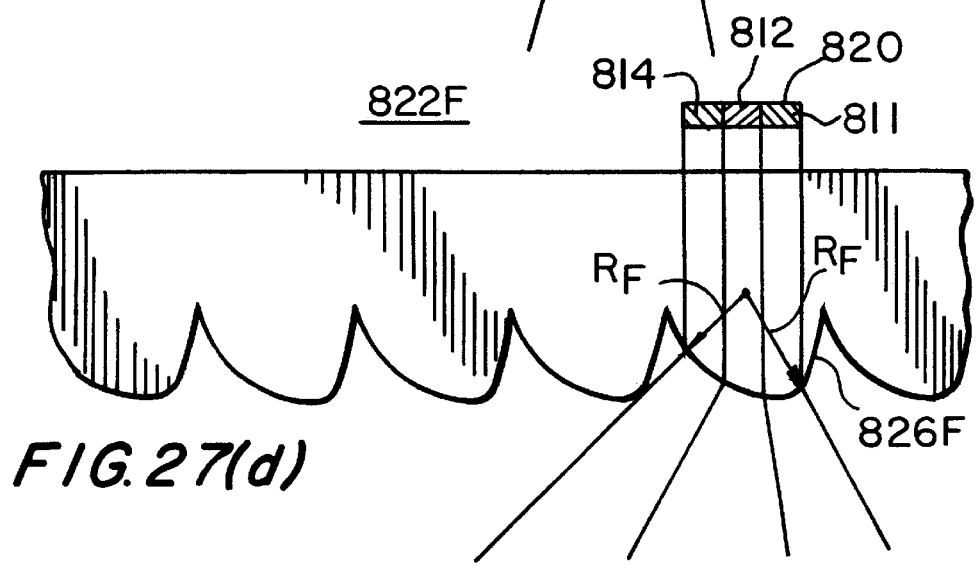

FIG. 27(d) shows a lenticule 826F near the right edge of the lenticular sheet 822F. Here $R_F$ is a radius for a left portion of the lenticule 826F and $R'_F$ is a radius for the central portion of lenticule 826F. The radius varies continuously from $R_F$ to $R'_F$ so that the angle through which the right side encoded image 814 may be viewed is made wider. The viewer 816 can see the right edge parallax image at a more severe viewing angle A, than with a standard lenticule sheet.

FIGS. 28(a) through 28(d) show an alternative to the seventh embodiment of the present invention. Here a uniform lenticular sheet 823 replaces the lenticular sheet with variously shaped lenticules 822 described above.

In this alternative, a Fresnel sheet 832 is disposed between the uniform lenticular sheet 823 and the image sheet 820, as shown in FIG. 28(a).

Figure 28B:
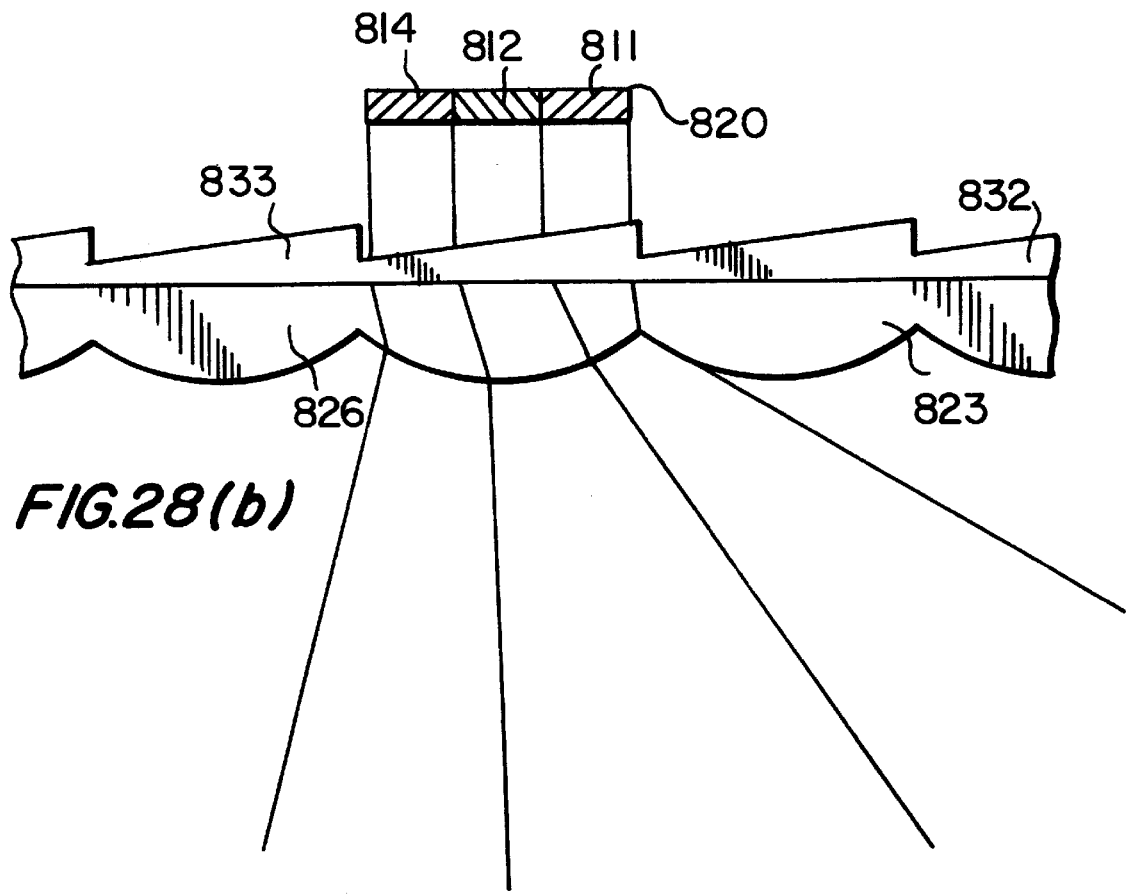

FIG. 28(b) shows a section of the image sheet 820, the Fresnel sheet 832 and the uniform lenticular sheet 823 in a region E near the right-most edge of the assembly.

The Fresnel sheet 832 has lens regions 833 that are aligned with the lenticules 826 of the lenticular sheet 823. Image regions 811, 812 and 814 that represent right-most, central, and left-most parallax views of a scene, respectively, are aligned with the lens regions 833 and lenticules 826.

A lens region 833 of the Fresnel sheet 832 diffracts the right-most parallax angle view 811 through a viewing angle that is displaced toward the plane of the lenticular sheet 823. As a result, a viewer will observe the right-most parallax angle views, from a region E near the edge of the image 820 through a more severe viewing angle A than would be possible without the Fresnel sheet 832.

Figure 28C:
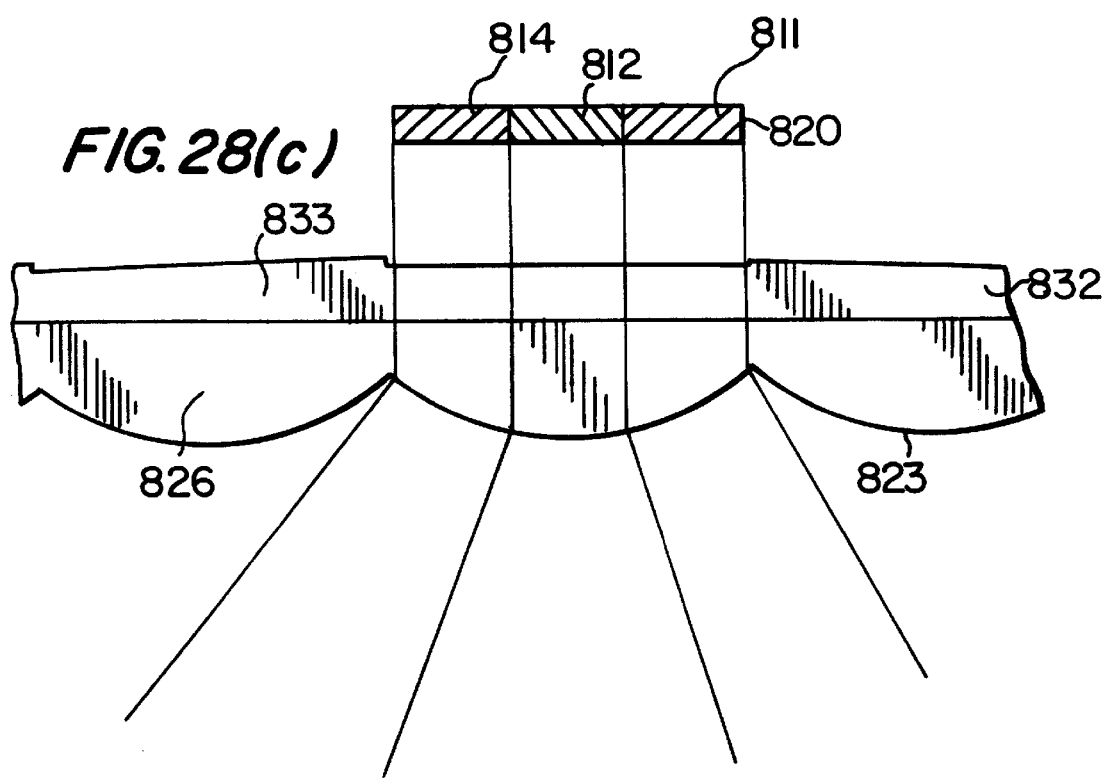

FIGS. 28(c) and 28(d) represent the aligned lenticular sheet 823, Fresnel sheet 832 and image 820 at the center C and left edge F of the image. As shown in FIG. 28(c), image segments 811, 812, 814 at the center of the image sheet 820 are not displaced by the Fresnel sheet 832. Left-most parallax angle views of a scene 814, toward the left edge of the image 820 are displace so that they are visible through a more severe viewing angle A as shown in FIG. 28(d).

Embodiments one through seven of the present invention are described here in terms of the lenticules or parallax barrier slits running vertically across the image region, thus allowing parallax angle or time sequence views of a scene to be recorded from left to right. The present invention is not limited to horizontally disposed views. Parallax angle or time sequence views of a scene may be captured and displayed using dispersive elements oriented at an arbitrary angle to vertical.

Although the present invention has been described hereinabove with reference to the preferred embodiments, it is to be understood that the invention is not limited to such illustrative embodiments alone, and various modifications may be contrived without departing from the spirit or essential characteristics thereof, which are to be determined solely from the appended claims.

What is claimed is:

1. A method of producing a plurality of three-dimensional images viewable using a lenticular sheet, comprising the steps of:

selecting a plurality of subjects;

choosing one of the plurality of subjects;

capturing a plurality of views of the chosen subject at different parallax angles;

parsing each of the views of the subject into a plurality of narrow rectangular segments equal to the number of lenticules of the lenticular sheet;

compressing the width of each narrow rectangular segment by a ratio equal to the reciprocal of the plurality of parallax views of the subject obtained in the step of capturing;

interleaving the plurality of segments;

printing the interleaved segments;

sequentially select each of the plurality of subjects and repeating the steps of capturing, parsing, compressing, interleaving and printing, whereby printed images are produced for each of the plurality of subjects;

combining the printed images; and sequentially aligning a plurality of the printed images with the lenticular sheet, whereby the position of each segment below each lenticule corresponds to the parallax angle view represented by that segment obtained in the step of capturing.

2. The method according to claim 1 wherein the step of combining includes binding the printed images to produce a book of images.

3. The method according to claim 1 wherein the step of combining includes linearly connecting the images to form a scroll.

4. A system for producing three-dimensional images, comprising:

viewing means composed of a plurality of parallel angularly dispersive regions;

capturing means for capturing multiple parallax views of a subject;

parsing means for dividing each of the multiple parallax views of the subject into a plurality of narrow rectangular segments equal in number to a number of angularly dispersive regions of the viewing means;

compressing means for compressing the narrow rectangular segments of each of the parallax views of the subject by a ratio determined by a reciprocal of the number of parallax views of the subject captured;

interleaving means for arranging the plurality of compressed segments of each of the parallax views of the subject;

printing means for producing an image of the compressed interleaved segments;

aligning means for aligning the angularly dispersive regions of the viewing means with the compressed interleaved segments of the image such that the position of each segment below each angularly dispersive region corresponds to the parallax angle view represented by that segment.

5. The system of claim 4 wherein the viewing means comprises a lenticular sheet.

6. The system of claim 5 wherein the viewing means comprises a parallax barrier sheet.

7. The system according to claim 4 further comprising selecting means for sequentially selecting a next subject of a plurality of subjects and repeatedly applying the capturing, parsing, compressing, interleaving and printing means, whereby a sequence of images for each of the plurality of subjects is produced.

8. The system according to claim 7 wherein the aligning means comprises:

target means printed on the images in spacial relation to the interleaved image segments;

housing means for holding the lenticular sheet;

indicator means connected to the housing mean, whereby alignment of the target with the indicator means causes the interleaved segments of the image to be aligned with the lenticules of the lenticular sheet;

optical sensing means for determining the position of the target means relative to the indicator means; and electronic feedback means for positioning the target means relative to the indicator means.

9. The system according to claim 7 wherein the sequence of images are bound to form a book of images.

10. The system according to claim 7 wherein the sequence of images are linearly connected to form a scroll of images.

11. The system according to claim 7 wherein the sequence of images are assembled to form a stack of image sheets.

12. The system according to claim 4 wherein the capturing means is a large diameter lens and, wherein the parsing, compressing and interleaving means are a second lenticular sheet upon which a range of parallax image views of the subject are focused by the large diameter lens.

13. The system according to claim 12 wherein the capturing means further comprises a movable slit disposed between the large diameter lens and the second lenticular sheet for selecting particular parallax angle views from the range of parallax angle views.

14. The system according to claim 4 wherein the capturing means are coplanar, laterally separated anamorphic lenses.

15. The system according to claim 14 wherein the capturing means includes movable shutter means for sequentially selecting one of each the images focused by the anamorphic lenses, whereby parallax images are captured by each of the anamorphic lenses at a different point in time to create animated three-dimensional images.

16. The system according to claim 7 wherein the sequence of images are transmissive images and wherein the aligning means comprise:

projecting means for projecting light through one of the transmissive images;

dispersive means for displaying the transmitted light from the transmissive image on a flat surface at a focal plane of the lenticular sheet; and focusing means for focusing the transmitted light onto the dispersive means.

17. The system of claim 16 wherein transmissive images are displayed sequentially to form a motion picture.

18. The system of claim 5 wherein:

a surface of the lenticular sheet comprises a plurality of lenticules, and a curvature of each one of the plurality of lenticules is a function of a distance that lenticule is displace from a center of the lenticular sheet, whereby parallax image views of the scene are displaced through a plurality of viewing angles that correspond to the distance the lenticule is displaced from the center of the lenticular sheet.

19. The system of claim 5, further comprising a Fresnel sheet disposed between and aligned with the printed image sheet and the lenticular sheet, whereby parallax angle views of the scene in a region toward an edge of the printed image are displaced through viewing angles that correspond to a distance between the region and a center of the image.

* * * * *